US012771952B1

(12) United States Patent
Lee et al.

(10) Patent No.: US 12,771,952 B1
(45) Date of Patent: Oct. 20, 2026

(54) OBJECT-BASED AUTOMATIC WHITE BALANCE BASED ON NEURAL NETWORK MODELS

(71) Applicant: Ambarella International LP, Santa Clara, CA (US)

(72) Inventors: Chih-Chun Lee, Hsinchu City (TW); Wei-Tsung Lee, HsinChu County (TW); Chung-Neng Wang, HsinChu City (TW)

(73) Assignee: Ambarella International LP, Santa Clara, CA (US)

( * ) Notice: Subject to any disclaimer, the term of this patent is extended or adjusted under 35 U.S.C. 154(b) by 384 days.

(21) Appl. No.: 17/982,592

(22) Filed: Nov. 8, 2022

Related U.S. Application Data

(63) Continuation-in-part of application No. 17/943,472, filed on Sep. 13, 2022, now Pat. No. 12,452,540.

(51) Int. Cl.

| | |
|---|---|
| ***H04N 23/88*** | (2023.01) |
| ***G06T 7/11*** | (2017.01) |
| ***G06T 7/62*** | (2017.01) |
| ***G06T 7/70*** | (2017.01) |
| ***G06V 10/56*** | (2022.01) |

(52) U.S. Cl.
CPC ............... *H04N 23/88* (2023.01); *G06T 7/11* (2017.01); *G06T 7/62* (2017.01); *G06T 7/70* (2017.01); *G06V 10/56* (2022.01); *G06T 2207/10016* (2013.01); *G06T 2207/10024* (2013.01); *G06T 2207/20084* (2013.01); *G06V 2201/07* (2022.01)

(58) Field of Classification Search
CPC .... H04N 9/73; G06T 7/11; G06T 7/62; G06T 7/70; G06T 2207/10016; G06T 2207/10024; G06T 2207/20084; G06V 10/56; G06V 2201/07
USPC ........................................................ 348/223.1
See application file for complete search history.

(56) References Cited

U.S. PATENT DOCUMENTS

| | | | | |
|---|---|---|---|---|
| 9,307,215 B1 * | 4/2016 | Liu | .......................... | H04N 23/88 |
| 2008/0291475 A1 * | 11/2008 | Wong | .................... | H04N 1/4074 358/1.9 |
| 2010/0214435 A1 * | 8/2010 | Chang | .................... | H04N 23/88 348/E9.051 |
| 2013/0242130 A1 * | 9/2013 | Peng | ...................... | H04N 23/88 382/164 |
| 2015/0326842 A1 * | 11/2015 | Huai | .................... | H04N 23/611 348/223.1 |

(Continued)

*Primary Examiner* — Jamie J Atala
*Assistant Examiner* — Mahmoud Kamal Abouzahra
(74) *Attorney, Agent, or Firm* — Maiorana Patent Law, PA

(57) ABSTRACT

An apparatus comprising an interface and a processor. The interface may be configured to receive pixel data. The processor may be configured to process the pixel data arranged as video frames, perform computer vision operations on the video frames to detect objects in the video frames, analyze characteristics of the objects detected, determine adaptive auto-white balance weightings in response to the characteristics of the objects detected, generate an auto-white balance weighting table based on the adaptive auto-white balance weightings and generate output video frames. Auto-white balance for the output video frames is determined in response to the auto-white balance weighting table and the video frames. The auto-white balance weighting table is generated for each of the video frames.

20 Claims, 15 Drawing Sheets

(56) References Cited

U.S. PATENT DOCUMENTS

| | | | | |
|---|---|---|---|---|
| 2016/0381303 | A1* | 12/2016 | Takami | H04N 23/88<br>348/223.1 |
| 2017/0032555 | A1* | 2/2017 | Gingawa | H04N 23/741 |
| 2017/0195648 | A1* | 7/2017 | Zhang | H04N 7/183 |
| 2018/0249141 | A1* | 8/2018 | Moriya | H04N 23/88 |
| 2022/0303446 | A1* | 9/2022 | Smith | H04N 23/63 |
| 2024/0107153 | A1* | 3/2024 | Swamy | H04N 23/61 |

* cited by examiner

OBJECT-BASED AUTOMATIC WHITE BALANCE BASED ON NEURAL NETWORK MODELS

This application relates to U.S. application Ser. No. 17/943,472, filed on Sep. 13, 2022, which is hereby incorporated by reference in its entirety.

FIELD OF THE INVENTION

The invention relates to video processing generally and, more particularly, to a method and/or apparatus for implementing object-based automatic white balance based on neural network models.

BACKGROUND

As digital technology has advanced, cameras have been used for an increasing number of applications. In particular, the application of cameras in transportation has become more and more important. Obtaining high quality and accurate images and video is critical to systems that rely on camera technology. One of the key factors that impacts image quality of a camera is white balance control. The control within a camera is done with automatic white balance (AWB) systems.

In conventional AWB systems, to calculate the overall white balance gains, a position related weighting table with fixed values is applied to the image or video frame. Some AWB systems have adopted multiple fixed weighting tables that are selected based on predefined scenes. However, the positions of objects of interest, objects not of interest and background objects can vary from time to time and from scene to scene in real world scenarios. Fixed weighting tables do not account for the movement of various types of objects. AWB systems that use the manually manipulated weighting tables cannot adapt to objects moving and/or changing scenes. Therefore, cameras that implement conventional AWB systems have limited quality and perception ability for automotive systems (i.e., ADAS, eMirror, CMS, etc.).

It would be desirable to implement object-based automatic white balance based on neural network models.

SUMMARY

The invention concerns an apparatus comprising an interface and a processor. The interface may be configured to receive pixel data. The processor may be configured to process the pixel data arranged as video frames, perform computer vision operations on the video frames to detect objects in the video frames, analyze characteristics of the objects detected, determine adaptive auto-white balance weightings in response to the characteristics of the objects detected, generate an auto-white balance weighting table based on the adaptive auto-white balance weightings and generate output video frames. Auto-white balance for the output video frames is determined in response to the auto-white balance weighting table and the video frames. The auto-white balance weighting table is generated for each of the video frames.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
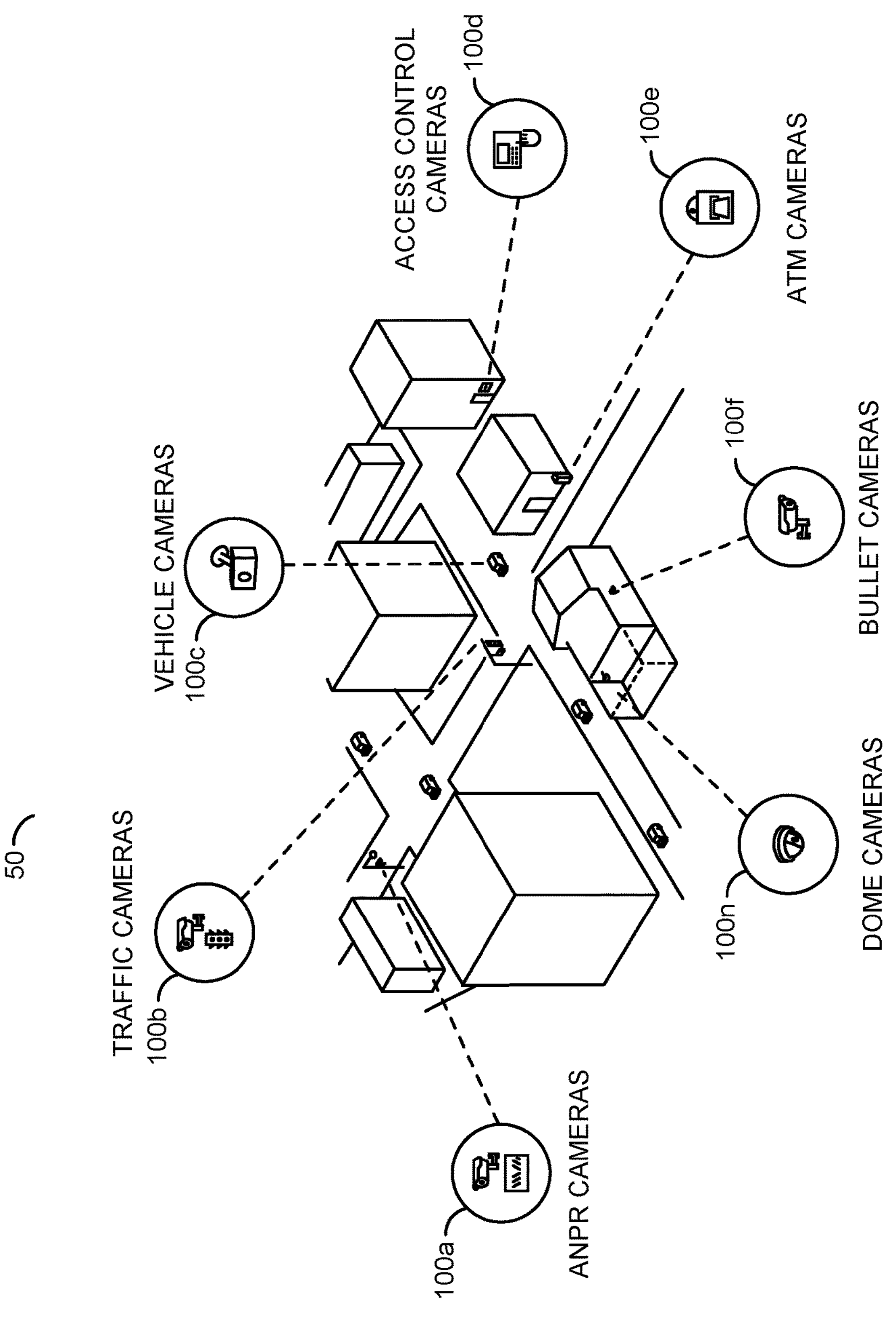
FIG. 1 is a diagram illustrating examples of edge devices that may utilize a processor configured to implement object-based automatic white balance based on neural network models in accordance with example embodiments of the invention.

Embodiments of the present invention include providing object-based automatic white balance based on neural network models that may (i) detect characteristics of objects to determine auto-white balance settings, (ii) be implemented with RGB sensors, RGB-IR sensors, RCCB sensors, a monocular image sensor, stereo image sensors, thermal sensors, etc., (iii) use a default weighting table when no objects are detected, (iv) dynamically generate weighting tables in response to real-time object detection, (v) generate an individualized auto-white balance weighting table for each video frame, (vi) analyze object type, object size and/or object location to determine weight values, (vii) combine weight values determined about objects detected at specific regions with gain values in the same regions, (viii) categorize objects detected to determine a weight value, and/or (ix) be implemented as one or more integrated circuits.

Embodiments of the present invention may be configured to perform computer vision operations on video frames in order to dynamically generate auto-white balance (AWB) weighting tables. The computer vision operations may be configured to implement neural network technology. The neural network technology may enable the computer vision operations to perform object detection accurately. The computer vision operations may be configured to determine and/or extract characteristics about objects detected in the video frames (e.g., object size, object position, object distance, object location, etc.). Determining the accurate object information may enable AWB calculations to be performed in order to dynamically adopt different weightings according to the importance of the objects in order to display each object with a suitable white balance gain.

Embodiments of the present invention may be configured to utilize the object information derived with the neural network computer vision models in order to calculate the white balance gains. The white balance gain control may be adapted to pre-determined color temperatures of regions of the video frames and objects rapidly. Rapidly adapting the white balance gain control (e.g., on a per frame basis) may provide output video frames that may be better suited to applications (e.g., vehicle and/or transportation applications) by making adjustments to enable objects to be more visible compared to implementations that use fixed value AWB weighting tables alone.

In some scenarios no objects of interest may be present in the video frame. When no detected object is present, a fixed value AWB weighting table may be implemented. For example, the overall white balance gain may apply a position related weighting table. In some embodiments, more than one fixed value AWB weighting table may be implemented based on predefined scenes (e.g., multiple different scenes when no objects have been detected).

In some scenarios where objects of interest are detected in the video frames, embodiments of the present invention may dynamically generate the AWB weighting tables. For example, as objects of interest vary from time to time and from scene to scene, the computer vision operations may detect and/or track the objects of interest and adapt the AWB weighting tables to the object(s) moving and/or the changing scenes. Generating the video frames with the dynamically adapted AWB weighting tables may provide superior quality compared to video frames generated using the fixed AWB weighting table(s) alone. The superior image quality of the video frames generated using the dynamically generated AWB weighting tables may improve a perception ability for automotive systems (e.g., ADAS, eMirror, CMS, etc.).

Information may be derived from neural network models about each object detected. The information about the objects may be used to calculate a white balance gains. The computer vision technology may be configured to accurately detect the information about the objects, such as object type, color temperature, size and position. The computer vision operations may provide granular detail about objects that may be associated with sub-regions (e.g., blocks of pixels) of each video frame. In response to the information about the objects associated with each block, the white balance gain for AWB may be calculated dynamically for each block of pixels according to a determined importance of the objects detected. AWB weighting tables may be computed for every video frame by considering object information (e.g., object type, object size and all other associated factors that may determine importance of objects). The white balance gain control may be adapted to determine the color and/or color temperature of regions and/or objects rapidly, which may be of particular benefit to camera applications for transportation. Determining the white balance gains on a per frame basis may be of particular benefit to real-time applications.

Fixed weighting tables may not provide position information about the importance of objects. Fixed weighting tables may not provide an ability to adapt to objects of interest. Manually manipulating fixed weight values may be slow to adapt to objects of interest, which may limit usefulness for various applications. In contrast, embodiments of the present invention may automatically generate an AWB weighting table for every frame. The weighting table may be computed at a block level of granularity.

Weightings may be adapted in response to the information about the objects determined by the neural network models implemented for computer vision. Each object may be classified as a particular object type. Each object type may have a predefined object weight value. The size of each object may be determined. The weight values calculated for each object may be applied to all the regions of the video frame that the object is in (e.g., larger sized object may cover a larger proportion of the video frame and be in more blocks). The location and/or coordinates of each object may be detected. The predefined weightings may be applied to the blocks where the objects are located. Other associated factors that may represent importance of objects in real use cases may be taken into account. For example, barriers on the road may be detected for transportation applications. In another example, different types of terrain may be detected (e.g., grass, mud, snow, sand, road, crushed stone, etc.). The amount of factors, and/or the method of accounting for the factors detected in order to determine the AWB weight values may be varied according to the design criteria of a particular implementation.

Referring to FIG. 1, a diagram illustrating examples of edge devices that may utilize a processor configured to implement object-based automatic white balance based on neural network models in accordance with example embodiments of the invention is shown. An overhead view of an area 50 is shown. In the example shown, the area 50 may be an outdoor location. Streets, vehicles and buildings are shown.

Devices 100*a*-100*n* are shown at various locations in the area 50. The devices 100*a*-100*n* may each implement an edge device. The edge devices 100*a*-100*n* may comprise smart IP cameras (e.g., camera systems). The edge devices 100*a*-100*n* may comprise low power technology designed to be deployed in embedded platforms at the edge of a network (e.g., microprocessors running on sensors, cameras, or other battery-powered devices), where power consumption is a critical concern. In an example, the edge devices 100*a*-100*n* may comprise various traffic cameras and intelligent transportation systems (ITS) solutions.

The edge devices 100*a*-100*n* may be implemented for various applications. In the example shown, the edge devices 100*a*-100*n* may comprise automated number plate recognition (ANPR) cameras 100*a*, traffic cameras 100*b*, vehicle cameras 100*c*, access control cameras 100*d*, automatic teller machine (ATM) cameras 100*e*, bullet cameras 100*f*, dome cameras 100*n*, etc. In an example, the edge devices 100*a*-100*n* may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100*a*-100*n* may be implemented at various indoor locations. In an example, edge devices 100*a*-100*n* may incorporate a convolutional neural network in order to be utilized in security (surveillance) applications and/or access control applications. In an example, the edge devices 100*a*-100*n* implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. The design, type and/or application performed by the edge devices 100*a*-100*n* may be varied according to the design criteria of a particular implementation.

Figure 2:
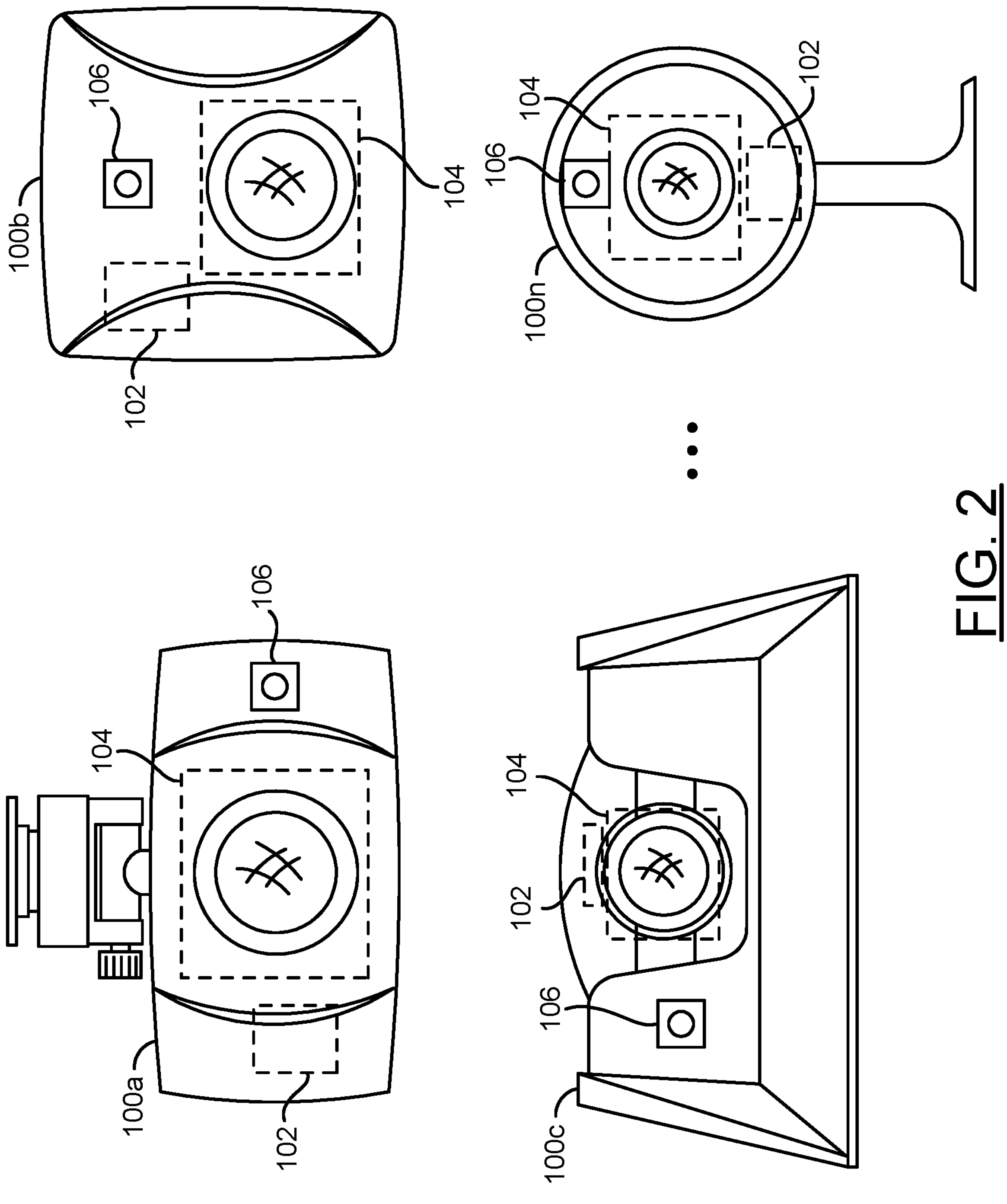
FIG. 2 is a diagram illustrating example cameras implementing an example embodiment of the present invention.

Referring to FIG. 2, a diagram illustrating example cameras implementing an example embodiment of the present invention is shown. The camera systems 100*a*-100*n* are shown. Each camera device 100*a*-100*n* may have a different style and/or use case. For example, the camera 100*a* may be an action camera, the camera 100*b* may be a ceiling mounted security camera, the camera 100*n* may be a webcam, etc. Other types of cameras may be implemented (e.g., home security cameras, battery powered cameras, doorbell cameras, stereo cameras, etc.). The design/style of the cameras 100*a*-100*n* may be varied according to the design criteria of a particular implementation.

Each of the camera systems 100*a*-100*n* may comprise a block (or circuit) 102, a block (or circuit) 104 and/or a block (or circuit) 106. The circuit 102 may implement a processor. The circuit 104 may implement a capture device. The circuit 106 may implement a structured light projector. The camera systems 100*a*-100*n* may comprise other components (not shown). Details of the components of the cameras 100*a*-100*n* may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment). The capture device 104 may capture the pixel data comprising a background image (e.g., the environment) with the speckle pattern. While each of the cameras 100*a*-100*n* are shown implementing the structured light projector 106, some of the cameras 100*a*-100*n* may be implemented without the structured light projector 106 (e.g., cameras that implement a sensor that does not capture IR light).

The cameras 100*a*-100*n* may be edge devices. The processor 102 implemented by each of the cameras 100*a*-100*n* may enable the cameras 100*a*-100*n* to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100*a*-100*n* may operate independently from each other). For example, each of the cameras 100*a*-100*n* may individually analyze the pixel data captured and perform the event/object detection locally. In some embodiments, the cameras 100*a*-100*n* may be configured as a network of cameras (e.g., security cameras that send video data to a central source such as network-attached storage and/or a cloud service). The locations and/or configurations of the cameras 100*a*-100*n* may be varied according to the design criteria of a particular implementation.

The capture device 104 of each of the camera systems 100*a*-100*n* may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
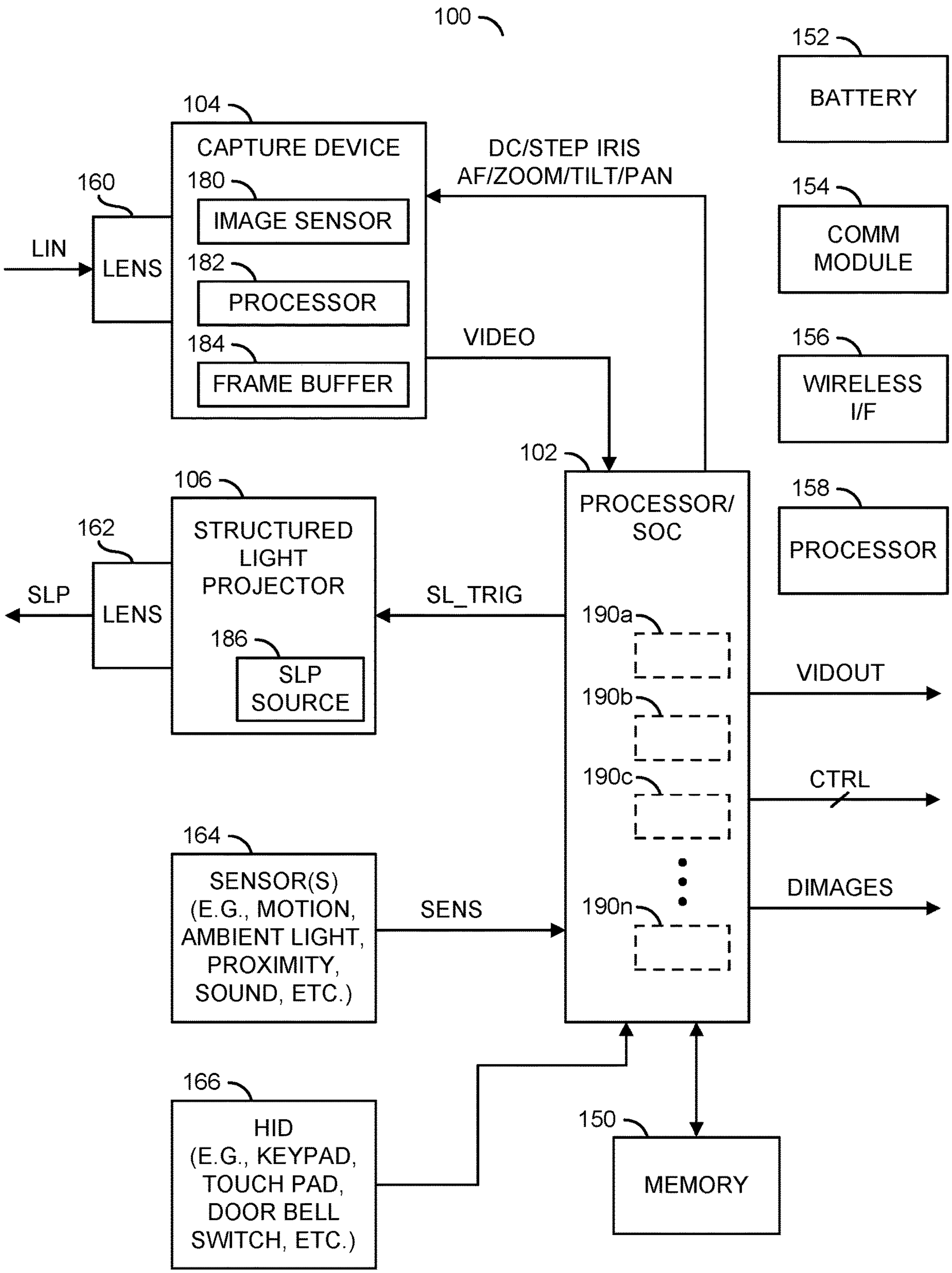
FIG. 3 is a block diagram illustrating a camera system.

Referring to FIG. 3, a block diagram of the camera system 100 is shown illustrating an example implementation. The camera system 100 may be a representative example of the cameras 100*a*-100*n* shown in association with FIG. 2. The camera system 100 may comprise the processor/SoC 102, the capture device 104, and the structured light projector 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames.

The memory 150 may store data. The memory 150 may implement various types of memory including, but not limited to, a cache, flash memory, memory card, random access memory (RAM), dynamic RAM (DRAM), etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets and/or metadata information. In some embodiments, the memory 150 may store reference images. The reference images may be used for computer vision operations, 3D reconstruction, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100*a*-100*n*, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signalVIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO and the signal SENS. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides nightvision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 M Pixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits)**190*a*-190*n*. The blocks 190*a*-190*n* may implement various hardware modules implemented by the processor 102. The hardware modules 190*a*-190*n* may be configured to provide various hardware components to implement a video processing pipeline. The circuits 190*a*-190*n* may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190*a*-190*n* may be configured to implement various security features (e.g., secure boot, I/O virtualization, etc.). Various implementations of the processor 102 may not necessarily utilize all the features of the hardware modules 190*a*-190*n*. The features and/or functionality of the hardware modules 190*a*-190*n* may be varied according to the design criteria of a particular implementation. Details of the hardware modules 190*a*-190*n*** may be described in association with U.S. patent application Ser. No. 16/831,549, filed on Apr. 16, 2020, (now U.S. Pat. No. 11,586,843), U.S. patent application Ser. No. 16/288,922, filed on Feb. 28, 2019, (now U.S. Pat. No. 11,001,231), U.S. patent application Ser. No. 15/593,463 , filed on May 12, 2017 (now U.S. Pat. No. 10,437,600), U.S. patent application Ser. No. 15/931,942, filed on May 14, 2020 (now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. PAt. No. 12,002,229), appropriate portions of which are hereby incorporated by reference in their entirety.

The hardware modules **190*a*-190*n* may be implemented as dedicated hardware modules. Implementing various functionality of the processor 102 using the dedicated hardware modules 190*a*-190*n* may enable the processor 102 to be highly optimized and/or customized to limit power consumption, reduce heat generation and/or increase processing speed compared to software implementations. The hardware modules 190*a*-190*n* may be customizable and/or programmable to implement multiple types of operations. Implementing the dedicated hardware modules 190*a*-190*n* may enable the hardware used to perform each type of calculation to be optimized for speed and/or efficiency. For example, the hardware modules 190*a*-190*n* may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190*a*-190*n* may enable computationally intensive operations (e.g., computer vision operations, video encoding, video transcoding, 3D reconstruction, depth map generation, liveness detection, etc.) to be performed locally by the camera system 100**.

One of the hardware modules **190*a*-190*n* (e.g., 190*a*) may implement a scheduler circuit. The scheduler circuit 190*a* may be configured to store a directed acyclic graph (DAG). In an example, the scheduler circuit 190*a*** may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190*a* may be configured to parse the acyclic graph to generate various operators. The operators may be scheduled by the scheduler circuit 190*a* in one or more of the other hardware modules 190*a*-190*n*. For example, one or more of the hardware modules 190*a*-190*n* may implement hardware engines configured to perform specific tasks (e.g., hardware engines designed to perform particular mathematical operations that are repeatedly used to perform computer vision operations). The scheduler circuit 190*a* may schedule the operators based on when the operators may be ready to be processed by the hardware engines 190*a*-190*n*.

The scheduler circuit 190*a* may time multiplex the tasks to the hardware modules 190*a*-190*n* based on the availability of the hardware modules 190*a*-190*n* to perform the work. The scheduler circuit 190*a* may parse the directed acyclic graph into one or more data flows. Each data flow may include one or more operators. Once the directed acyclic graph is parsed, the scheduler circuit 190*a* may allocate the data flows/operators to the hardware engines 190*a*-190*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190*a*-190*n* (e.g., 190*b*) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190*b* may implement a convolutional neural network (CNN) module. The CNN module 190*b* may be configured to perform the computer vision operations on the video frames. The CNN module 190*b* may be configured to implement recognition of objects through multiple layers of feature detection. The CNN module 190*b* may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190*b* may be configured to implement convolutional neural network capabilities. The CNN module 190*b* may be configured to implement computer vision using deep learning techniques. The CNN module 190*b* may be configured to implement pattern and/or image recognition using a training process through multiple layers of feature-detection. The CNN module 190*b* may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be configured to perform face detection, face recognition and/or liveness judgment. For example, face detection, face recognition and/or liveness judgment may be performed based on a trained neural network implemented by the CNN module 190*b*. In some embodiments, the CNN module 190*b* may be configured to generate the depth image from the structured light pattern. The CNN module 190*b* may be configured to perform various detection and/or recognition operations and/or perform 3D recognition operations.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190*b* as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*). For example, the results of training data (e.g., a machine learning model) may be pre-programmed and/or loaded into the processor 102. The CNN module 190*b* may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190*b* may be varied according to the design criteria of a particular implementation.

The CNN module 190*b* may implement the feature extraction and/or object detection by performing convolution operations. The convolution operations may be hardware accelerated for fast (e.g., real-time) calculations that may be performed while consuming low power. In some embodiments, the convolution operations performed by the CNN module 190*b* may be utilized for performing the computer vision operations. In some embodiments, the convolution operations performed by the CNN module 190*b* may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190*b* may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190*b* may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190*b* to extract features from the training data may be varied according to the design criteria of a particular implementation.

Each of the hardware modules 190*a*-190*n* may implement a processing resource (or hardware resource or hardware engine). The hardware engines 190*a*-190*n* may be operational to perform specific processing tasks. In some configurations, the hardware engines 190*a*-190*n* may operate in parallel and independent of each other. In other configurations, the hardware engines 190*a*-190*n* may operate collectively among each other to perform allocated tasks. One or more of the hardware engines 190*a*-190*n* may be homogeneous processing resources (all circuits 190*a*-190*n* may have the same capabilities) or heterogeneous processing resources (two or more circuits 190*a*-190*n* may have different capabilities).

Figure 4:
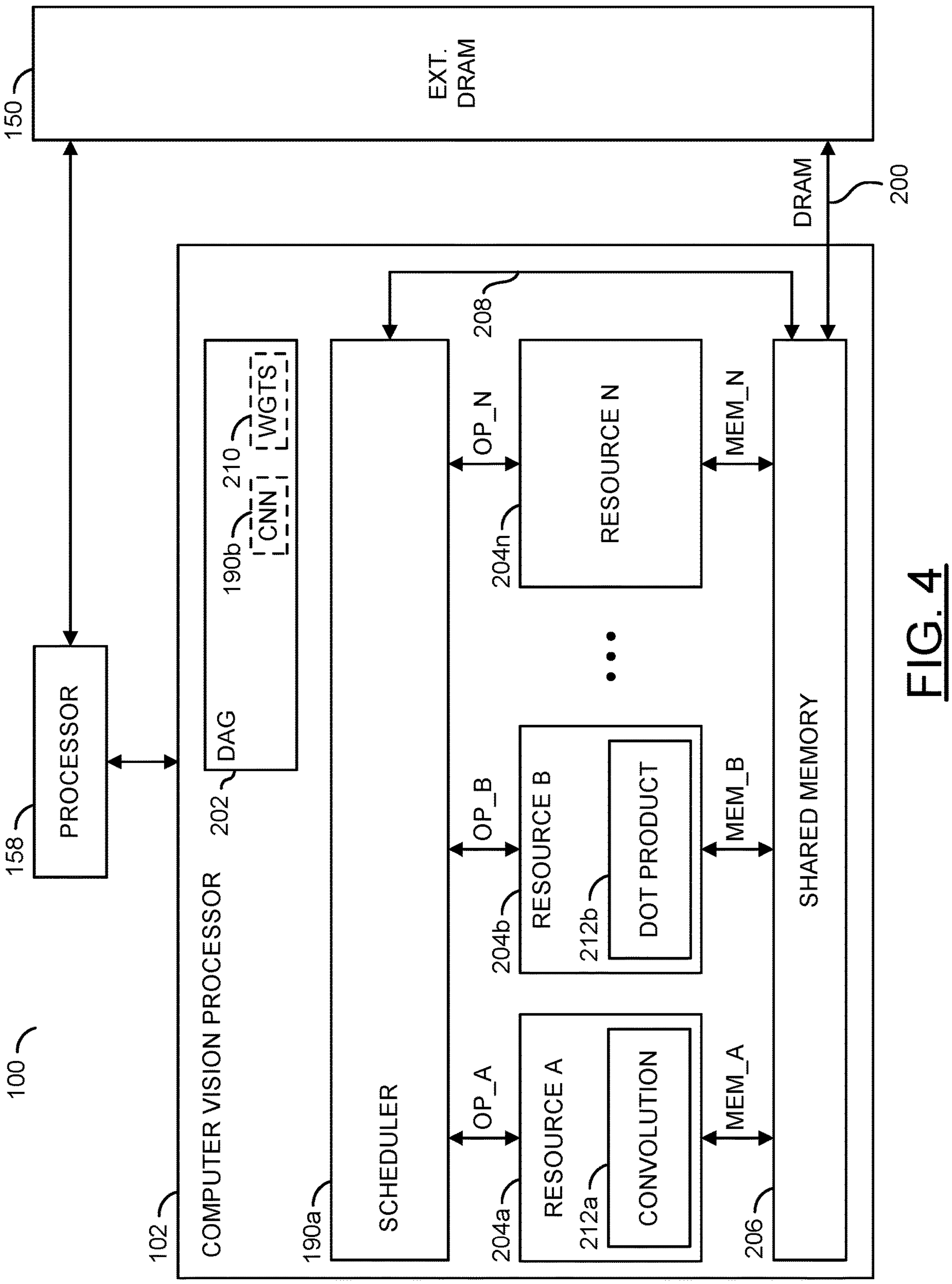
FIG. 4 is a diagram illustrating processing circuitry of a camera system implementing a convolutional neural network configured to perform object-based auto white balance using neural network models.

Referring to FIG. 4, a diagram illustrating processing circuitry of a camera system implementing a convolutional neural network configured to perform object-based auto white balance using neural network models is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190*a*, a block (or circuit) 202, one or more blocks (or circuits) 204*a*-204*n*, a block (or circuit) 206 and a path 208. The block 202 may implement a directed acyclic graph (DAG) memory. The DAG memory 202 may comprise the CNN module 190*b* and/or weight/bias values 210. The blocks 204*a*-204*n* may implement hardware resources (or engines). The block 206 may implement a shared memory circuit. In an example embodiment, one or more of the circuits 204*a*-204*n* may comprise blocks (or circuits) 212*a*-212*n*. In the example shown, the circuit 212*a* and the circuit 212*b* are implemented as representative examples in the respective hardware engines 204*a*-204*b*. One or more of the circuit 202, the circuits 204*a*-204*n* and/or the circuit 206 may be an example implementation of the hardware modules 190*a*-190*n* shown in association with FIG. 3.

In an example, the processor 158 may be configured to program the circuit 102 with one or more pre-trained artificial neural network models (ANNs) including the convolutional neural network (CNN) 190*b* having multiple output frames in accordance with embodiments of the invention and weights/kernels (WGTS) 210 utilized by the CNN module 190*b*. In various embodiments, the CNN module 190*b* may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190*b* with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190*b*, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors implemented by the processing circuitry of the camera system 100 and configured to operate together.

In an example, the circuit 212*a* may implement convolution operations. In another example, the circuit 212*b* may be configured to provide dot product operations. The convolution and dot product operations may be used to perform computer (or machine) vision tasks (e.g., as part of an object detection process, etc.). In yet another example, one or more of the circuits 204*c*-204*n* may comprise blocks (or circuits) 212*c*-212*n* (not shown) to provide convolution calculations in multiple dimensions. In still another example, one or more of the circuits 204*a*-204*n* may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190*b* using the circuits 190*a*, 204*a*-204*n*, and 206.

Multiple signals (e.g., OP_A-OP_N) may be exchanged between the circuit 190*a* and the respective circuits 204*a*-204*n*. Each of the signals OP_A-OP_N may convey execution operation information and/or yield operation information. Multiple signals (e.g., MEM_A-MEM_N) may be exchanged between the respective circuits 204*a*-204*n* and the circuit 206. The signals MEM_A-MEM_N may carry data. A signal (e.g., DRAM) may be exchanged between the circuit 150 and the circuit 206. The signal DRAM may transfer data between the circuits 150 and 190*a* (e.g., on the transfer path 208).

The scheduler circuit 190*a* is generally operational to schedule tasks among the circuits 204*a*-204*n* to perform a variety of computer vision related tasks as defined by the processor 158. Individual tasks may be allocated by the scheduler circuit 190*a* to the circuits 204*a*-204*n*. The scheduler circuit 190*a* may allocate the individual tasks in response to parsing the directed acyclic graphs (DAGs) provided by the processor 158. The scheduler circuit 190*a* may time multiplex the tasks to the circuits 204*a*-204*n* based on the availability of the circuits 204*a*-204*n* to perform the work.

Each circuit 204*a*-204*n* may implement a processing resource (or hardware engine). The hardware engines 204*a*-204*n* are generally operational to perform specific processing tasks. The hardware engines 204a-204n may be implemented to include dedicated hardware circuits that are optimized for high-performance and low power consumption while performing the specific processing tasks. In some configurations, the hardware engines 204a-204n may operate in parallel and independent of each other. In other configurations, the hardware engines 204a-204n may operate collectively among each other to perform allocated tasks.

The hardware engines 204a-204n may be homogenous processing resources (e.g., all circuits 204a-204n may have the same capabilities) or heterogeneous processing resources (e.g., two or more circuits 204a-204n may have different capabilities). The hardware engines 204a-204n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204a-204n may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204a-204n implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204a-204n may be implemented solely as hardware circuits. In some embodiments, the hardware engines 204a-204n may be implemented as generic engines that may be configured through circuit customization and/or software/firmware to operate as special purpose machines (or engines). In some embodiments, the hardware engines 204a-204n may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204a-204n may be selected for a particular process and/or thread by the scheduler 190a. The scheduler 190a may be configured to assign the hardware engines 204a-204n to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190a and/or the hardware engines 204a-204n). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204a-204n. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190a to the shared memory 206. The transfer path 208 may also be operational to move data from the shared memory 206 to the scheduler circuit 190a.

The processor 158 is shown communicating with the computer vision processor 102. The processor 158 may be configured as a controller for the computer vision processor 102. In some embodiments, the processor 158 may be configured to transfer instructions to the scheduler 190a. For example, the processor 158 may provide one or more directed acyclic graphs to the scheduler 190a via the DAG memory 202. The scheduler 190a may initialize and/or configure the hardware engines 204a-204n in response to parsing the directed acyclic graphs. In some embodiments, the processor 158 may receive status information from the scheduler 190a. For example, the scheduler 190a may provide a status information and/or readiness of outputs from the hardware engines 204a-204n to the processor 158 to enable the processor 158 to determine one or more next instructions to execute and/or decisions to make. In some embodiments, the processor 158 may be configured to communicate with the shared memory 206 (e.g., directly or through the scheduler 190a, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 5:
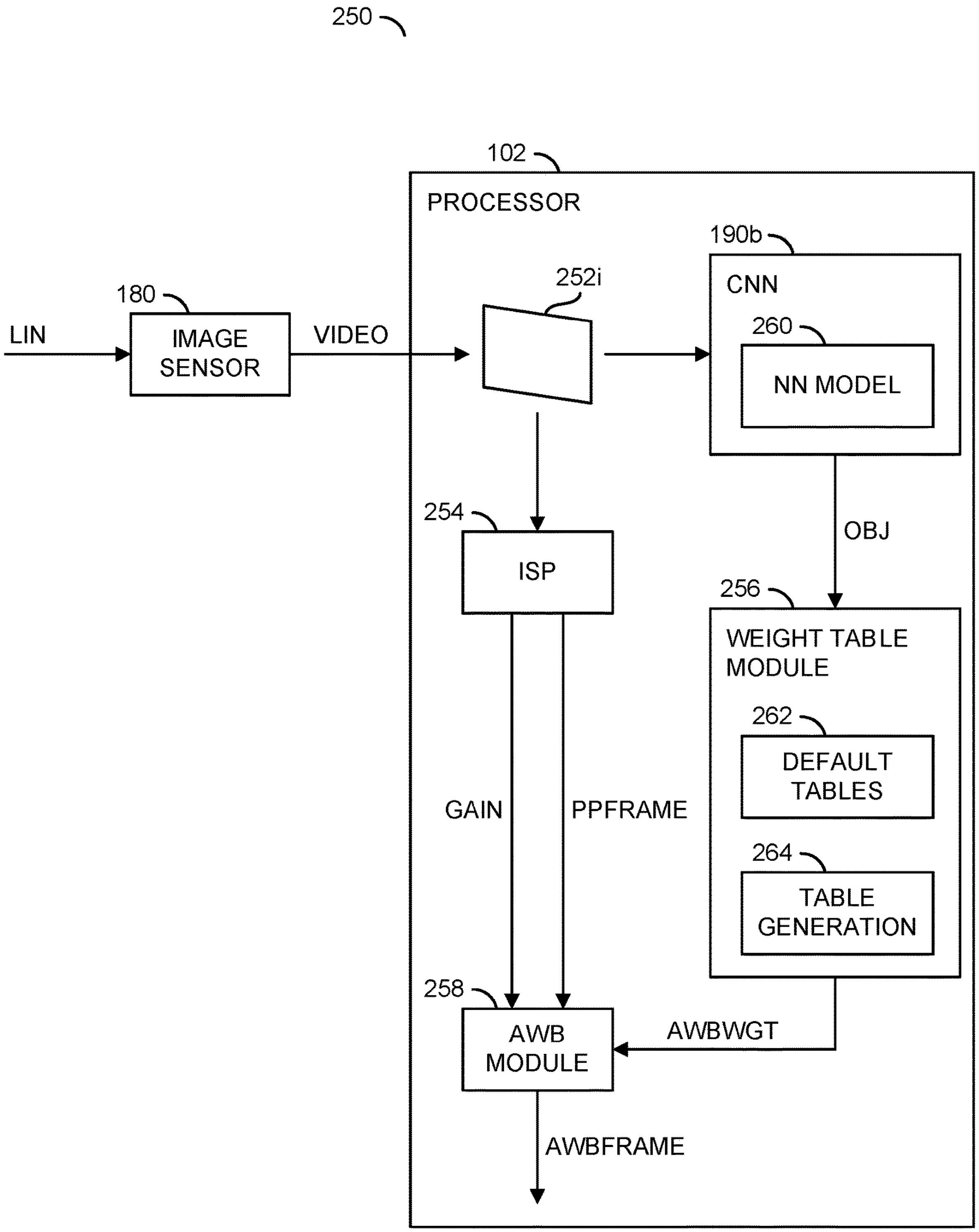
FIG. 5 is a block diagram illustrating a generation of an auto white balance weighting table for each video frame.

Referring to FIG. 5, a block diagram illustrating a generation of an auto white balance weighting table for each video frame is shown. A system 250 is shown. The system 250 may comprise a portion of the components of one of the camera systems 100a-100n. The system 250 may comprise the image sensor 180 and/or the processor 102. The processor 102 may be configured to generate the auto white balance weighting tables in response to pixel data received from the image sensor 180 arranged as video frames. The processor 102 may be further configured to apply the auto white balance weighting tables to the weighting tables to generate auto white balanced video frames.

The image sensor 180 may be configured to convert the light input LIN into pixel data. The pixel data generated by the image sensor 180 may be presented to the processor 102. The signal VIDEO may comprise the pixel data generated by the image sensor 180.

The image sensor 180 may be configured to generate pixel data that may be operated on by a neural network. Various types of images of image sensors may be implemented. For example, the computer vision operations may be performed regardless of the type of sensor implemented by the image sensor 180 (e.g., any type of sensor that may be supported by the neural network model). In one example, the image sensor 180 may implement a RGB sensor. In another example, the image sensor 180 may implement an RGB-IR sensor. In yet another example, the image sensor 180 may implement a RCCB sensor. In still another example, the image sensor 180 may implement a thermal imaging sensor. In some embodiments, the image sensor 180 may comprise a monocular camera. In some embodiments, the image sensor 180 may comprise a stereo camera. The type of image sensor(s) implemented and/or the type of pixel data generated by the image sensor 180 may be varied according to the design criteria of a particular implementation.

A video frame 252*i* is shown. The processor 102 may be configured to generate video frames (e.g., video frames 252*a*-252*n*) in response to the pixel data. In an example, the processor 102 may be configured to arrange the pixel data in the signal VIDEO into video frames. For example, the video frame 252*i* may comprise raw pixel data from the image sensor 180 that may be operated on by the processor 102.

The processor 102 may be configured to generate AWB weight tables for each of the video frames 252*a*-252*n* in real-time. The AWB weight tables may be dynamically adjusted in response to the objects and/or object regions detected in each of the video frames 252*a*-252*n*. In the example shown, the video frame 252*i* may be a representative example of anyone of the video frames 252*a*-252*n* generated by the processor 102. For example, the processor 102 may operate on each of the video frames 252*a*-252*n* individually to generate a unique AWB weight table specific to the characteristics of the objects and/or object regions detected in the video frame analyzed. Each of the AWB weight tables may be individualized for the particular one of the video frames 252*a*-252*n* being analyzed. While there may be a possibility that the object-based auto white balance implemented may result in two or more of the video frames 252*a*-252*n* having the exact same weight tables, the weight tables may be generated on a per frame basis (e.g., an individualized weight table may be generated for each video frame).

The processor 102 may comprise the CNN module 190*b*, a block (or circuit) 254, a block (or circuit) 256 and/or a block (or circuit) 258. The circuit 254 may implement an image signal processor (ISP). The circuit 256 may implement a weight table module. The circuit 258 may implement an auto-white balance module. The processor 102 may comprise other components (not shown). The number, type and/or arrangement of the components of the processor 102 may be varied according to the design criteria of a particular implementation.

The video frame 252*i* may be presented to the CNN module 190*b* and the ISP 254. For example, operations performed by the CNN module 190*b* and the ISP 254 may be performed in parallel and/or substantially in parallel. For example, the CNN module 190*b* may be configured to perform the computer vision operations on the pixel data of the video frames 252*a*-252*n* while the video frames 252*a*-252*n* are preprocessed by other components of the processor 102.

The ISP 254 may be configured to perform various image signal processing operations on the video frame 252*i*. The ISP 254 may perform preprocessing of the pixel data in the video frames 252*a*-252*n*. The ISP 254 may be one or more components of a video processing pipeline implemented by the processor 102. The ISP 254 may be configured to generate preprocessed video frames in response to the video frame 252*i*. The ISP 254 may be configured to extract statistical information about the video frame 252*i*.

The ISP 254 may be configured to operate on various blocks and/or sub-regions of the video frame 252*i*. For example, the ISP 254 may calculate statistics for each block of pixels in the video frame 252*i*. By generating the statistics for each block of pixels in the video frame 252*i*, the ISP 254 may provide granular statistical information for sub-regions of each of the video frames 252*a*-252*n*.

The ISP 254 may be configured to generate a signal (e.g., PPFRAME) and/or a signal (e.g., GAIN). The signal PPFRAME may comprise a preprocessed video frame. For example, the ISP 254 may generate the preprocessed video frame PPFRAME in response to the video frame 252*i*. The preprocessed video frame in the signal PPFRAME may be used for further processing (e.g., post-processing) by the processor 102. The signal GAIN may comprise statistical information about a white balance gain of each block of the video frame 252*i*. In an example, the signal GAIN may comprise a white balance gain value for each sub-region of the video frame 252*i*. The signal GAIN may comprise one example of statistical information about the video frame 252*i* generated by the ISP 254. The ISP 254 may be configured to generate additional types of statistical information (e.g., pixel value data, color information, speckle pattern information, luma values, tonal values, etc.). In some embodiments, the white balance gain information of the signal GAIN may be communicated alongside other statistical information. The signal PPFRAME and the signal GAIN may be presented to the AWB module 258.

The CNN module 190*b* may comprise a block (or circuit) 260. The block 260 may comprise a neural network model. The CNN module 190*b* may comprise other components (not shown) In some embodiments, the CNN module 190*b* may comprise the weights 210. The number, type and/or arrangement of the components of the CNN module 190*b* may be varied according to the design criteria of a particular implementation.

The neural network model 260 may enable the camera systems 100*a*-100*n* to perform computer vision operations. In some embodiments, the neural network model 260 may be configured to generate the feature set for the camera systems 100*a*-100*n*. The neural network model 260 may be configured to detect particular types of objects and/or object regions, classify detected objects, determine characteristics of detected objects, determine a size of detected objects, determine a color temperature of objects and/or object regions, extract features in order to detect objects, calculate a distance of detected objects from the lens 160, etc. The neural network model 260 may comprise reference images that may be compared with the video frame 252*i*. The neural network 260 may be updatable. For example, the CNN module 190*b* may be configured to receive training data (e.g., images comprising labels as metadata that may identify objects in the image to use as ground truth). The training data may be used to continually update and/or refine the neural network model 260.

The neural network model 260 may enable the CNN module 190*b* to detect and/or classify objects. For example, the neural network model 260 may define the types of objects that may be detected by the CNN module 190*b*. In the example shown, the CNN module 190*b* may comprise a single implementation of the neural network model 260. In some embodiments, the CNN module 190*b* may comprise multiple implementations of the neural network model 260. For example, each implementation of the neural network model 260 may be configured to detect a specific type of object. Neural network models may be provided as libraries that may be loaded into the CNN module 190*b*. For example, third parties may provide neural network models designed for detecting specific types of objects and an operator of the camera systems 100*a*-100*n* may select (or purchase) the libraries to install as the neural network model 260 based on the application the camera systems 100*a*-100*n* may be used for (e.g., a camera system used in a vehicle application may comprise neural network models configured to detect pedestrians, road signs, vehicles, etc. while a camera system designed for a security system may be comprise neural network models configured to detect and/or identify faces). The neural network model 260 implemented may determine which objects in the video frame 252*i* may be considered to be objects of interest. The number and/or configuration of the neural network(s) 260 implemented may be varied according to the design criteria of a particular implementation.

The CNN module 190*b* may generate a signal (e.g., OBJ) in response to the video frame 252*i*. The signal OBJ may comprise information and/or characteristics about the objects detected. For example, the neural network model 260 may generate statistics, characteristics, location data, classifications, color data, distance data, depth data, color temperature data, etc. about each of the objects detected in the video frame 252*i*. The signal OBJ may be presented to the weight table module 256. In some embodiments, the signal OBJ may be presented to other components (not shown) that perform other operations in response to the objects detected (e.g., an autonomous driving system, driver assist features, security features, etc.).

The signal OBJ may be generated for each of the video frames 252*a*-252*n*. Each of the video frames 252*a*-252*n* may comprise different objects, objects in different locations, objects at different distances, etc. The signal OBJ may be individualized for each of the video frames 252*a*-252*n* based on the contents detected by the computer vision operations. In an example, the signal OBJ may comprise at least an object classification (e.g., object type) and/or an object distance. In another example, the signal OBJ may comprise information about which blocks/subregions that the detected object is present in (e.g., information about a location in the video frame and/or information about the size of the object in the video frame). For example, the distance or the size of the objects may be related to the number of pixels with coverage of the detected object. In some embodiments, the signal OBJ may provide an indication that no objects of interest have been detected. The signal OBJ may be provided for each of the video frames 252*a*-252*n* analyzed by the CNN module 190*b*.

The weight table module 256 may be configured to generate auto-white balance weight tables in response to the objects detected. The weight table module 256 may determine object-based auto white balance weight tables in response to data provided by the neural network models 260. The weight table module 256 may receive the signal OBJ comprising the data provided by the neural network models 260. The weight table module 256 may generate a signal (e.g., AWBWGT) in response to the signal OBJ. The signal AWBWGT may comprise AWB weight tables for the video frame 252*i*. One set of AWB weight tables may be provided in the signal AWBWGT for each of the video frames 252*a*-252*n* analyzed. Details of the AWB weight tables may be described in association with FIG. 6.

The weight table module 256 may comprise a block (or circuit) 262 and/or a block (or circuit) 264. The circuit 262 may comprise a default tables module. The circuit 264 may comprise a table generation module 264. The weight table module 256 may comprise other components (not shown). The number, type and/or arrangement of the components of the weight table module 256 may be varied according to the design criteria of a particular implementation.

The default tables module 262 may comprise fixed AWB weight tables. The fixed AWB weight tables provided by the default tables module 262 may be provided as the signal AWBWGT in response to the signal OBJ indicating that no objects of interest have been detected in the video frame 252*i*. In some embodiments, the fixed AWB weight tables may comprise a fixed AWB weight value for every block of pixels (e.g., a value of 1). In some embodiments, the default tables module 262 may comprise multiple fixed AWB weight tables that may be selected in response to general information about the video frame 252*i*. For example, the neural network model 260 may not detect an object of interest, but may classify the video frame 252*i* as a particular type of scene (e.g., a roadway scene, an indoor office scene, an outdoor daytime scene, a night time scene, a scene comprising regions with shade, etc.). Each type of scene may have a unique and/or individualized fixed AWB weight tables.

The fixed AWB weight tables may comprise predefined AWB weight values based on the particular scene when no objects are detected. For example, for a roadway scene, the fixed weight tables may comprise AWB weight values that have AWB priority in the road section and/or a cloud section of the video frame instead of regions that comprise buildings. In another example, for a day time scene, the AWB weight values of the fixed weight table may comprise lower AWB weight values in the sky to ensure a natural sunlight color is used for the scene while providing higher AWB weight values for sections with other objects (e.g., snow-covered objects) to prevent unnatural color temperatures from being selected. The default tables module 262 may generate fixed AWB weight values for the signal AWBWGT for each of the video frames 252*a*-252*n* analyzed that the neural network model 260 has determined has no object of interest present. The AWB weight value priority for various types of video frames may be predefined according to the design criteria of a particular implementation.

The table generation module 264 may be configured to dynamically generate the AWB weight values for each of the video frames 252*a*-252*n* in response to the information about the objects detected in the signal OBJ. In an example, the table generation module 264 may select an AWB weight value of 1 for blocks/subregions of pixels that do not comprise the detected object and/or object regions of interest. The table generation module 264 may provide an increased value (e.g., a value greater than 1) or a decreased value (e.g., a value of zero) for blocks/subregions of pixels that do comprise the detected objects and/or object regions of interest. For example, the table generation module 264 may select an AWB weight value for the blocks/subregions of pixels that comprise the detected object and/or object region in response to the object type. In some embodiments, the table generation module 264 may start with one of the default weight tables specific to a particular type of scene detected, and then provide the increased values for blocks of pixels that comprise the detected objects of interest and/or decreased values for blocks of pixels that comprise the detected objects that should be ignored to prevent incorrect white balance results.

In some embodiments, the table generation module 264 may generate a weight table for each characteristic of the objects of interest detected. In an example, for auto white balance the characteristic of the objects of interest may be the object type (e.g., one weight table based on the object type). The AWB weight values for each block/subregion of pixels in the video frame 252*i* may be presented in the signal AWBWGT. The table generation module 264 may generate AWB weight values for the signal AWBWGT for each of the video frames 252*a*-252*n* analyzed that the neural network model 260 has determined has an object and/or object region of interest present. The number of weight tables generated and/or the particular AWB weight values selected for each object of interest may be determined according to the design criteria of a particular implementation.

The AWB module 258 may be configured to perform the auto-white balance gain adjustments to the video frames 252*a*-252*n*. The AWB module 258 may receive the preprocessed video frame and perform AWB adjustments to generate an AWB adjusted video frame. The AWB module 258 may be configured to receive the signal GAIN, the signal PPFRAME and/or the signal AWBWGT. The AWB module 258 may generate a signal (e.g., AWB FRAME). The signal AWBFRAME may comprise the video frame 252*i* with the AWB adjustment. The AWB module 258 may generate an AWB adjusted video frame for each of the video frames 252*a*-252*n* analyzed by the processor 102.

The AWB module 258 may receive the pixel data for the preprocessed video frame (e.g., the signal PPFRAME) from the ISP 254. The AWB module 258 may receive the white balance gain values for each block/subregion of the preprocessed video frame (e.g., the signal GAIN) from the ISP 254. The AWB module 258 may receive the AWB weight values for each block/subregion of the preprocessed video frame (e.g., the signal AWBWGT) from the weight table module 256. The AWB module 258 may be configured to combine the white balance gain values and the AWB weight values to determine the AWB adjustment (e.g., the white balance gain level) to apply to each subregion of the preprocessed video frame. The AWB module 258 may be configured to perform the AWB adjustment to generate the AWB adjusted video frames.

In some embodiments, the signal AWBFRAME may be presented as an output of the processor 102 (e.g., the signal VIDOUT for an output to a display for viewing). In some embodiments, the signal AWBFRAME may be used internal to the processor 102. For example, the signal AWBFRAME may be used for additional postprocessing (e.g., generating depth maps, generating thermal images, used for input to other computer vision systems that make decisions based on objects in the video frames, etc.). The use of the AWB adjusted video frames in the signal AWBFRAME may be varied according to the design criteria of a particular implementation.

In some embodiments, other video processing operations may be performed in parallel with the auto-white balance operations. For example, the ISP 254 may further provide luma values of the video frames 252*a*-252*n* and the CNN 190*b* may perform video operations to detect objects for auto-exposure operations on the video frames 252*a*-252*n*. In an example, auto-exposure operations may be performed in parallel to the auto-white balance operations. Details of the auto-exposure operations may be described in association with U.S. application Ser. No. 17/943,472, filed on Sep. 13, 2022, appropriate portions of which are incorporated by reference.

Figure 6:
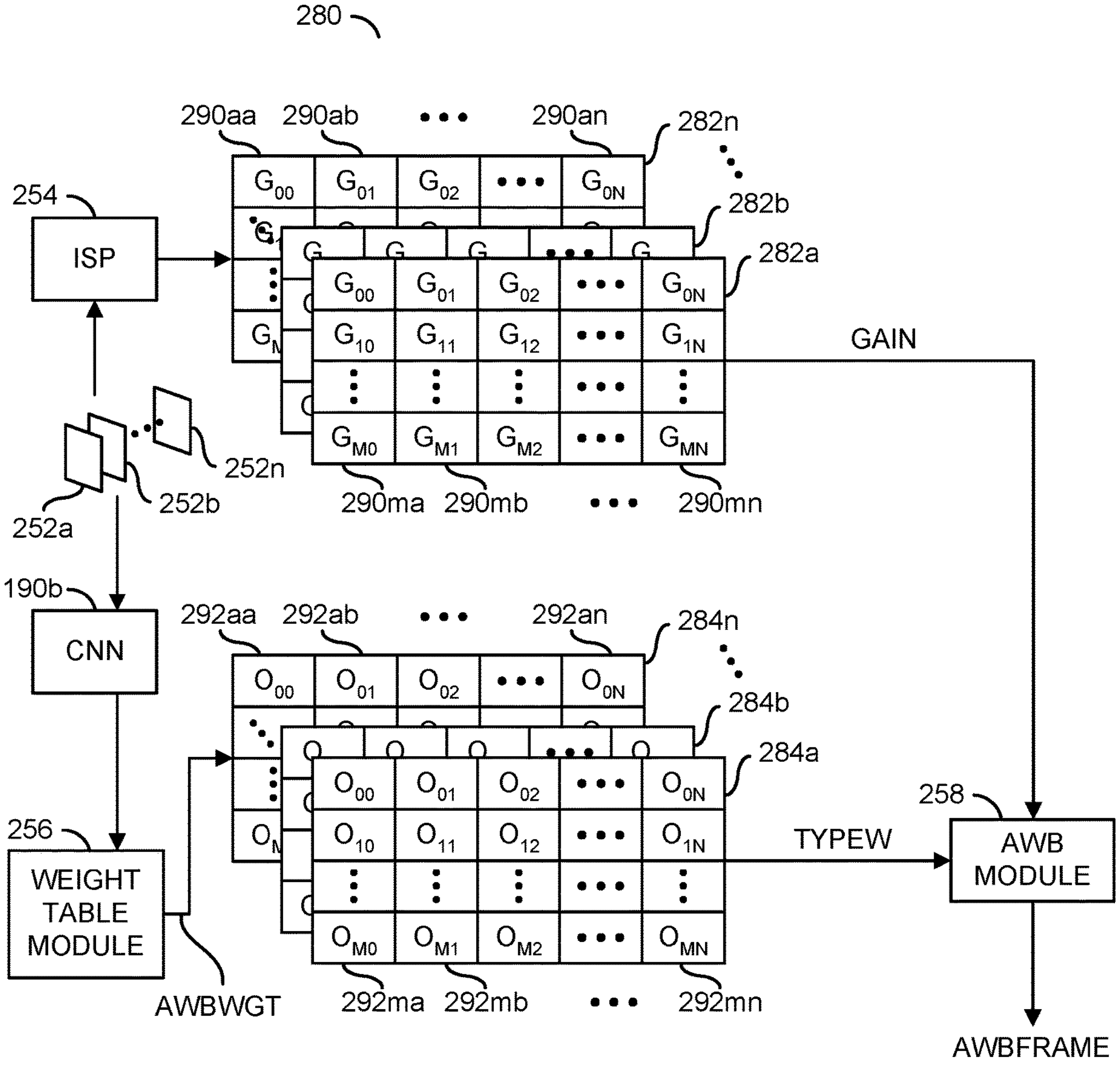
FIG. 6 is a diagram illustrating a combination of gain weight values and object weight values.

Referring to FIG. 6, a diagram illustrating a combination of gain weight values and object weight values is shown. A visualization 280 is shown. The visualization 280 may illustrate the combination of various weight values presented to the AWB module 258 in order to generate the AWB adjusted video frames. The visualization 280 may comprise the CNN module 190*b*, the video frames 252*a*-252*n*, the ISP 254, the weight table module 256 and/or the AWB module 258.

The ISP 254 may present the signal GAIN to the AWB module 258. The signal GAIN may comprise a number of white balance gain value tables 282*a*-282*n*. Each of the white balance gain value tables 282*a*-282*n* may correspond to a respective one of the video frames 252*a*-252*n* generated by the processor 102. For example, the white balance gain value tables 282*a*-282*n* may be presented to the AWB module 258 via the signal GAIN in a sequential order as the video frames 252*a*-252*n* are analyzed in real time.

The weight table module 256 may present the signal AWBWGT to the AWB module 258. In the example shown, the signal AWBWGT may comprise a signal (e.g., TYPEW). The signal TYPEW may comprise object weight values. The object weight values may comprise weight values selected based on the object type classified by the neural network model 260.

The signal TYPEW may comprise a number of object weight value tables 284*a*-284*n*. Each of the object weight value tables 284*a*-284*n* may correspond to a respective one of the video frames 252*a*-252*n* generated by the processor 102. For example, the object weight value tables 284*a*-284*n* may be presented to the AWB module 258 via the signal TYPEW in a sequential order as the video frames 252*a*-252*n* are analyzed in real time.

Each of the white balance gain value tables 282*a*-282*n* may comprise an array of white balance gain values 290*aa*-290*mn*. The array of white balance gain values 290*aa*-290*mn* may comprise a white balance gain value that corresponds to each block/subregion of pixels in the corresponding video frames 252*a*-252*n*. For example, the ISP 254 may provide the statistics that comprise a white balance gain value for each block (or tile) of the video frames 252*a*-252*n*. In the example shown, the video frames 252*a*-252*n* (and thus the corresponding white balance gain value tables 282*a*-282*n*) may comprise M×N tiles (or blocks or subregions). For example, the white balance gain value 290*aa* may correspond to a white balance gain value for the top left block of pixels (e.g., the white balance gain value $G_{0,0}$, the white balance gain value 290*mn* may correspond to a white balance gain value for the bottom right block of pixels (e.g., the white balance gain value $G_{M,N}$), etc. In one example, each of the white balance gain values 290*aa*-290*mn* may comprise a value from 1 through 10 assigned by the ISP 254 based on an amount of white balance gain captured for the pixels. In another example, the white balance gain values 290*aa*-290*mn* may comprise a value in the 16-bit domain (e.g., 0 to $(2^{16})-1$). The range of the white balance gain values 290*aa*-290*mn* may be determined by the chip design of the ISP 254. In the example shown, the white balance gain values 290*aa*-290*mn* may comprise a numerical value $G_{M,N}$. The number of tiles and/or the pixel density of each tile may depend on the hardware implemented in the camera systems 100*a*-100*n*.

Each of the object weight value tables 284*a*-284*n* may comprise an array of object weight values 292*aa*-292*mn* (e.g., adaptive auto-white balance weightings). The array of object weight values 292*aa*-292*mn* may comprise an adaptive object weight value that corresponds to each block/subregion of pixels in the corresponding video frames 252*a*-252*n*. For example, the CNN module 190*b* may provide the classifications of each object detected via the signal OBJ. In one example, the table generation module 264 may assign a value for the object weight value for each block (or tile) of the video frames 252*a*-252*n*. In another example, the default tables module 262 may assign a fixed value for the object weight value for each block (or tile) of the video frames 252*a*-252*n* (e.g., a value of 1) when no objects are detected. In the example shown, the video frames 252*a*-252*n* (and thus the corresponding object weight value tables 284*a*-284*n*) may comprise M×N tiles (or blocks or subregions). For example, the object weight value 292*aa* may correspond to an object weight value for the top left block of pixels (e.g., the object weight value $O_{0,0}$), the object weight value 292*mn* may correspond to an object weight value for the bottom right block of pixels (e.g., the object weight value $O_{M,N}$), etc. In one example, each of the object weight values 292*aa*-292*mn* may comprise a value from 0 through 10 assigned by the weight table module 256 based on the classification of the object captured in the block of pixels. In another example, the object weight values 292*aa*-292*mn* may be modified according to the particular application (e.g., the number of different object classes). In the example shown, the object weight values 292*aa*-292*mn* may comprise a numerical value $O_{M,N}$. The number of tiles and/or the pixel density of each tile may depend on the hardware implemented in the camera systems 100*a*-100*n*.

The neural network model 260 may be configured to detect and/or classify different types of objects. The table generation module 264 may comprise predefined object weights for each of the types of objects detected. In one example, all of the object weight values 292*aa*-292*mn* may comprise a default value of 1 and may be increased or decreased when an object of interest is detected in the corresponding one of the tiles of the video frames 252*a*-252*n*. In an example of a vehicle camera application, the table generation module 264 may comprise a predefined object weight value of 10 for a cloud object, a predefined object weight value of 8 for snow region and/or snow covered object, a predefined object weight value of 6 for a road, a predefined object weight value of 0 for a blue sky, a predefined object weight value of 0 for a tree/hedge, a predefined object weight value of 0 for a sand covered object and/or a desert region, a predefined object weight value fora grassy region, a predefined object weight value fora muddy region and/or a predefined object weight value of 1 for tiles with no objects and/or neutral objects, etc. The predefined object weight values for each particular classification (or type) of object may be varied according to the design criteria of a particular implementation.

The object weight values 292*aa*-292*mn* assigned may be higher when the object is determined to be more important. The auto-white balance operations may be performed in order to generate the output video frames (e.g., the signal AWBFRAME) that may have a consistent color temperature. For example, the color temperature of the video frames may be adjusted such that the overall color temperature of the image is neutral. In one example, the object weight values 292*aa*-292*mn* may be assigned such that objects detected that provide a significant amount of blue color temperature light sources or red color temperature light sources are adjusted by adding the opposite color. In one example, using the object weight values 292*aa*-292*mn* to reduce a weight of regions that correspond to trees or the sky, the influence of the trees or the sky on the white balance level may be decreased. In another example, using the object weight values 292*aa*-292*mn* to increase a weight of regions that correspond to the road, the influence of the road on the white balance level may be increased. The object weight values 292*aa*-292*mn* may be adjusted based on the object types detected using the neural network model 260 in order to eliminate unrealistic color casts so that the color selection is accurate for the particular scene in the output video frame. The types of objects and/or the particular weights given to particular types of objects may be varied according to the design criteria of a particular implementation.

In some embodiments, the object weight value may be set to 1 when no object is detected for the corresponding tile in the video frames 252*a*-252*n*. In an example, the default tables module 262 may set all of the object weight values 292*aa*-292*mn* to 1 when no objects are detected. In some embodiments, the white balance gain weight values 290*aa*-290*mn* and/or the object weight values 292*aa*-292*mn* may be integer values within a particular range (e.g., 0-10, 0-100, 0-1000, etc.). In some embodiments, the white balance gain weight values 290*aa*-290*mn* and/or the object weight values 292*aa*-292*mn* may be floating point values within a particular range (e.g., 0.0-5.0, 0.0-10.0, 0.0-100.0, etc.).

In some embodiments, additional weight value tables may be calculated (e.g., a size weight value table, a distance weight table, a location weight value table, etc.) with each type of additional weight value table comprising a similar arrangement of an array of weight values for particular characteristics detected by the neural network model 260. In some embodiments, additional characteristics of the objects detected by the neural network model 260 may be inherent to the arrangement of the pixel data. For example, the memory cell location of each tile may indicate which locations that the particular objects are located in the video frames 252*a*-252*n*. Similarly, the number of tiles that each object is located within may provide an indication of the size of the objects. For example, larger objects may have an object weight value in more of the tiles (e.g., the larger object may be in 10 tiles) than a smaller object (e.g., a smaller object may be in 3 tiles).

The AWB module 258 may be configured to receive one of the white balance gain value tables 282*a*-282*n*, and a corresponding one of the object weight value tables 284*a*-284*n* via the signal GAIN and the signal TYPEW. The AWB module 258 may set the white balance gain weight values 290*aa*-290*mn* and the object weight values 292*aa*-292*mn* of the objects to the relative position of the tiles. The AWB module 258 may perform an automatic white balance gain calculation for the AWB adjustment. The automatic white balance gain calculation may be performed according to an equation EQ1.

$$\sum_{j=0}^{m\square-1} \sum_{i=0}^{n-1} G_{j,i} * O_{j,i} \quad \text{EQ1}$$

The automatic white balance gain calculation in the equation EQ1 may be used to perform the AWB adjustment to the preprocessed video frames. The AWB module 258 may generate the signal AWBFRAME comprising the video frames with the adjusted AWB gain.

Figure 7:
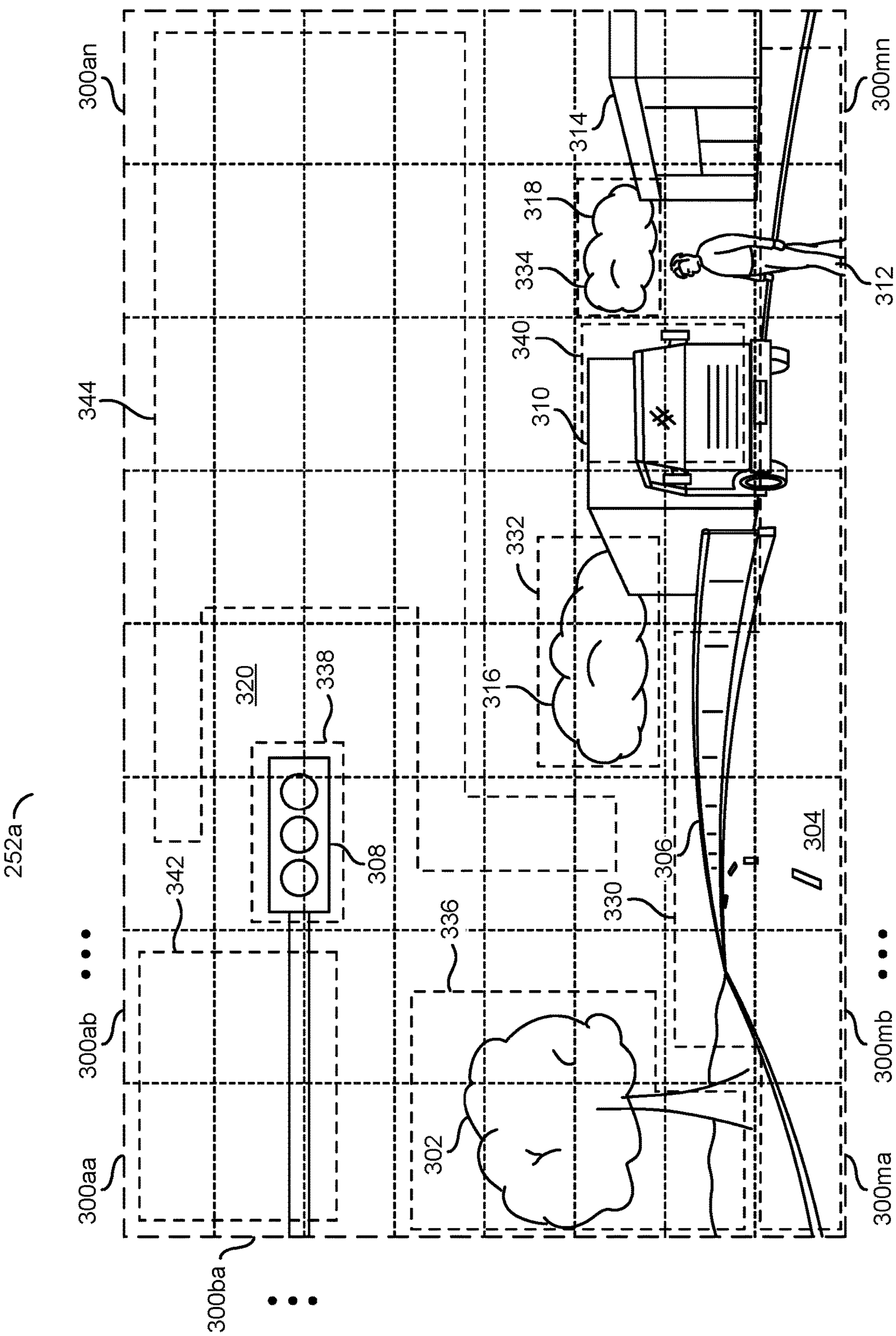
FIG. 7 is a diagram illustrating a detection of road and cloud region objects in an example video frame.

Referring to FIG. 7, a diagram illustrating a detection of road and cloud region objects in an example video frame is shown. The example video frame 252*a* may be one of the video frames 252*a*-252*n* processed by the processor 102. The example video frame 252*a* may be an illustrative example of one video frame of a sequence of the video frames 252*a*-252*n* analyzed/evaluated by the CNN module

190*b* and/or the neural network model 260. The video frame 252*a* may be presented to the ISP 254 in parallel for preprocessing.

The example video frame 252*a* may comprise pixel data arranged as a video frame provided to the CNN module 190*b*. The CNN module 190*b* may be configured to analyze the pixel data of the video frame 252*a* to detect objects of interest, object regions of interest and/or determine characteristics of the objects of interest detected (e.g., a size, a location, a distance, a classification, a color temperature, etc. of various types of objects/subjects) in the video frame 252*a*. In an example, the computer vision neural network model 260 implemented by CNN module 190*b* may be configured to detect various objects in the example video frame 252*a*. The example video frame 252*a* may comprise a RGB image. In some embodiments, a similar analysis may be performed on the video frame 252*a* that may comprise an RGB-IR image, a RCCB image, a thermal image, etc.

The example video frame 252*a* is shown divided into tiles 300*aa*-300*mn*. The tiles 300*aa*-300*mn* of the video frame 252*a* may comprise blocks and/or subregions of pixels of the video frames 252*a*. In the example shown, the tiles 300*aa*-300*mn* may comprise equally sized blocks of pixels arranged as a grid for the video frame 252*a*. The tiles 300*aa*-300*mn* may correspond to memory cells of the shared memory 206 in the processor 102. For example, the amount of pixel data in each of the tiles 300*aa*-300*mn* may be limited to the amount of capacity in the shared memory 206. The location of each of the tiles 300*aa*-300*mn* may correspond to the respective array of white balance gain values 290*aa*-290*mn*, and the respective array of object weight values 292*aa*-292*mn*. For example, the white balance gain value 290*aa* of the white balance gain value table 282*a* and the object weight value 292*aa* of the object weight table 284*a* may correspond to the location of the tile 300*aa* of the video frame 252*a*.

The example video frame 252*a* may be a video frame captured of an outdoor roadway area (e.g., a view from the camera systems 100 implementing the capture device 104). In one example, the example video frame 252*a* may be a video frame captured outdoors by a smartphone camera. In another example, the example video frame 252*a* may be a video captured by a smart doorbell and/or a home security camera. In the example shown, the example video frame 252*a* may be a video captured by a camera implemented on a vehicle driving on a roadway. The use-case for capturing and analyzing the example video frame 252*a* may be varied according to the design criteria of a particular implementation.

The example video frame 252*a* may comprise various objects and/or object regions. Not all of the objects in the example video frame 252*a* may be determined to be an object of interest by the neural network model 260. The example video frame 252*a* may comprise a tree 302, a roadway region 304, a divider/barrier 306, a traffic light 308, a transport truck vehicle 310, a pedestrian 312, a building 314, a cloud 316, a cloud 318 and/or a sky region 320. Some objects may not be relevant to determining automatic white balance gain (e.g., may not be objects of interest). For example, vehicles, pedestrians, buildings, street signs, trees, etc. may not be objects of interest that the computer vision operations may detect for the purposes of determining auto white balance. For example, the divider/barrier 306, the traffic light 308, the transport truck vehicle 310, the pedestrian 312 and/or the building 314 may not be considered objects of interest by the neural network model 260. However, the divider 306, the traffic light 308, the transport truck vehicle 310, the pedestrian 312 and/or the building 314 may be detected for other purposes (e.g., auto exposure, lane detection, collision warning, etc.). The traffic light 308 may be hanging overhead in the sky above the roadway 304. The transport truck vehicle 310 may be partially behind the divider/barrier 306. The pedestrian 312 may be walking in front of the transport truck vehicle 310 along the roadway 304.

Dotted shapes 330-344 are shown. The dotted shapes 330-344 may represent the detection of an object/subject by the computer vision operations performed by the processor 102. The dotted shapes 330-344 may each comprise the pixel data corresponding to an object detected by the computer vision operations pipeline and/or the neural network model 260. In the example shown, the dotted shapes 330-344 may be detected in response to traffic light detection, vehicle detection, roadway detection, sky region detection, obstacle detection and/or pedestrian detection operations performed by the neural network 260 (e.g., the computer network model 260 may be libraries configured to detect people, vehicles, roadways, sky regions, clouds, and/or traffic signals). The dotted shapes 330-344 are shown for illustrative purposes. In an example, the dotted shapes 330-344 may be visual representations of the object detection (e.g., the dotted shapes 330-344 may not appear on an output video frame). In another example, the dotted shapes 330-344 may be a bounding box generated by the processor 102 displayed on the output video frames to indicate that an object has been detected (e.g., the bounding boxes 330-344 may be displayed in a debug mode of operation).

The computer vision operations may be configured to detect characteristics of the detected objects, behavior of the objects detected, a movement direction of the objects detected and/or aliveness of the objects detected. The characteristics of the objects may comprise a height, length, width, slope, an arc length, a color, a color temperature, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object may comprise a distance measurement from the lens 160 to the detected object. The behavior and/or liveness may be determined in response to the type of object and/or the characteristics of the objects detected. While one example video frame 252*a* is shown, the behavior, movement direction and/or liveness of an object may be determined by analyzing a sequence of the video frames 252*a*-252*n* captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding box 330 may be the region of interest of the roadway 304, the bounding box 332 may be the region of interest for the cloud 316, the bounding box 334 may be the region of interest for the cloud 318, the bounding box 336 may be the region of interest for the tree 302, the bounding box 338 may be the region of interest of the traffic light 308, the bounding box 340 may be the region of interest of the transport truck vehicle 310, the bounding box 342 and the bounding box 344 may generally represent the region of interest for the sky region 320. In an example, the settings (e.g., the feature set) for the processor 102 (e.g., the computer vision AI neural network model 260 implemented by the CNN module 190*b*) may define objects of interest to be roadways, clouds, trees, plants and/or a sky region. For example, decorations, furniture, vehicles, pedestrians and/or buildings may not be objects of interest for a feature set defined to detect roadways, clouds, trees, plants and/or a sky region. In the example shown, the bounding boxes 330-344 are shown having a square (or rectangular) shape. In some embodiments, the shape of the bounding boxes 330-344 that correspond to the objects of interest detected may be formed to follow the shape of the body of the people detected and/or the shape of the vehicles detected (e.g., an irregular shape that follows the curves and/or the body shape of the detected objects).

The processor 102 and/or the CNN module 190*b* may be configured to implement region, pedestrian and/or face detection techniques. In some embodiments, the processor 102 and/or the CNN module 190*b* may detect other types of subjects as objects of interest (e.g., animals, vehicles, moving objects, falling objects, etc.). The computer vision techniques may be configured to detect the regions of interest (ROIs) of the detected objects 330-344 and/or generate the information about the detected objects 330-344. For example, the bounding boxes 330-344 may be a visual representation of the ROIs detected. The processor 102 may loop the computer vision technique (e.g., iteratively perform object/subject detection throughout the example video frame 252*a*) in order to determine if any objects of interest (e.g., as defined by the feature set) are within the field of view of the lens 160 and/or the image sensor 180.

While only the objects 330-344 are shown as objects of interest, the computer vision operations performed by the processor 102 and/or the CNN module 190*b* may be configured to detect background objects and/or other types of objects, even if not used for the AWB adjustments. The background objects may be detected for other computer vision purposes (e.g., training data, labeling, depth detection, etc.), but may not be used for the purposes of the AWB adjustment technique performed by the apparatus 100. The type(s) of subjects identified as the objects of interest 330-344 may be varied according to the design criteria of a particular implementation.

The bounding boxes (or ROIs) of the detected objects 330-344 may be within one or more of the tiles 300*aa*-300*nn*. The CNN module 190*b* may associate each of the detected objects 330-344 with the tiles 300*aa*-300*nn* that the objects occupy. The association between the detected objects 330-344 with the tiles 300*aa*-300*nn* may be used to assign the object weight values for each of the detected objects 330-344. In the example shown, the detected object 330 (e.g., the roadway 304) may correspond to at least eleven tiles (e.g., the tiles 300*gb*-300*gd* and the tiles 300*ma*-300*mn*), the detected object 332 (e.g., the cloud 316) may correspond to at least four tiles (e.g., the tiles 300*ed*-300*ee* and the tiles 300*fd*-300*fe*), the detected object 334 (e.g., the cloud 318) may correspond to at least one tile (e.g., the tile 300*fg*), the detected object 336 (e.g., the tree 302) may correspond to at least 7 tiles (e.g., the tiles 300*da*-300*db*, the tiles 300*ea*-300*eb*, the tiles 300*fa*-300*fb* and the tile 300*ga*), the detected object 338 (e.g., the traffic light 308) may correspond to at least four tiles (e.g., the tiles 300*bc*-300*bd* and the tiles 300*cc*-300*cd*), the detected object 340 (e.g., the transport truck vehicle 310) may correspond to at least 2 tiles (e.g., the tile 300*ff* and the tile 300*gf*), the detected objects 342-344 (e.g., the sky region 320) may correspond to at least 28 tiles (e.g., the tiles 300*aa*-300*an*, the tiles 300*ba*-300*bb*, the tiles 300*be*-300*bn*, the tiles 300*ca*-300*cb*, the tiles 300*ce*-300*cn*, the tiles 300*dc*-300*dn*, the tile 300*ec* and the tile 300*fc*). The particular location of the tiles 300*aa*-300*mn* that may be occupied by the objects 330-344 may be used to determine the location for the AWB adjustment. The number of the tiles 300*aa*-300*mn* occupied by the objects 330-344 may be used to determine how many of the tiles 300*aa*-300*mn* to adjust using the particular weight values associated with the detected objects.

The processor 102 (e.g., the CNN module 190*b* implementing the neural network model 260) may determine whether any objects/subjects are present in the video frames analyzed. In the example video frame 252*a*, the objects of interest may be the tree 302, roadway region 304, the cloud 316, the cloud 318 and the sky region 320. If an object of interest has been captured in the video frame 252*a*, the CNN module 190*b* may record a size of the objects (e.g., the number of tiles 300*aa*-300*mn* occupied by each object) and an offset (e.g., a location with respect to the edges of the video frame 252*a*) of the objects (e.g., the locations of the tiles 300*aa*-300*mn* that the object occupies). The CNN module 190*b* may also record the type of object detected (e.g., the classification) and/or a distance of the object from the lens 160 (e.g., a monocular distance calculation, a stereo camera disparity calculation, a calculation based on the speckle pattern generated by the structured light projector 106, etc.). The processor 102 may store the information about the objects detected 330-344in the memory 150 and/or present the signal OBJ comprising the characteristics of the objects to the weight table module 256.

In one example, the location information about the objects detected 330-344 may comprise the x,y coordinates. In another example, the location information about the objects detected 330-344 may comprise one or more tile numbers of the tiles 300*aa*-300*mn* that are occupied by the objects detected 330-344. In an example, the location characteristic for the object 338 may comprise the x,y coordinates (or offset) indicating that the object 338 is located on the left side near the top of the video frame 252*a* and occupies four tiles.

Figure 8:
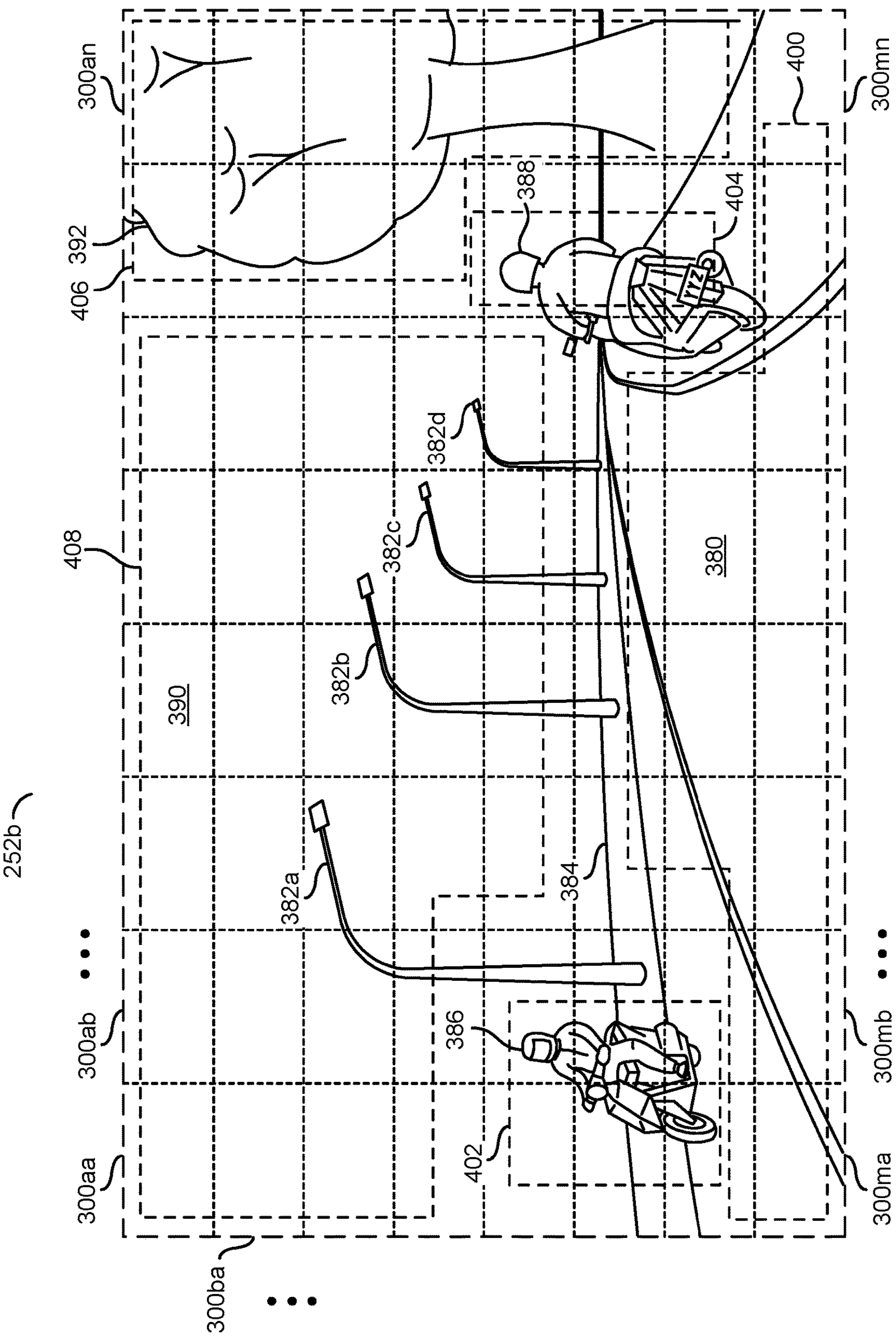
FIG. 8 is a diagram illustrating a detection of sky object regions and tree object regions in an example video frame.

Referring to FIG. 8, a diagram illustrating a detection of sky object regions and tree object regions in an example video frame is shown. An example video frame 252*b* is shown. The example video frame 252*b* may be one of the video frames 252*a*-252*n* processed by the processor 102. Similar to the example video frame 252*a* shown in association with FIG. 7, the example video frame 252*b* may be an illustrative example of one video frame of a sequence of the video frames 252*a*-252*n* analyzed/evaluated by the CNN module 190*b* and/or the neural network model 260.

Similar to the example video frame 252*a*, the example video frame 252*b* may be divided into the tiles 300*aa*-300*mn*. The CNN module 190*b* may be configured to analyze the pixel data of the video frame 252*b* to detect objects of interest and/or determine characteristics of the objects of interest detected (e.g., a size, a location, a distance, a classification, etc. of various types of objects/subjects) in the video frame 252*b*. The example video frame 252*b* may be a video frame captured of an outdoor roadway area (e.g., a view from the camera systems 100 implementing the capture device 104).

The example video frame 252*b* may comprise various objects. Not all of the objects in the example video frame 252*b* may be determined to be an object of interest by the neural network model 260. The example video frame 252*b* may comprise a roadway 380, a street lights 382*a*-382*d*, an off-road region 384, a motorcycle 386, a motorcycle 388, a sky region 390 and/or a tree 392. Generally, background objects may not be objects of interest that the computer vision operations may detect. For example, the street lights

382*a*-382*d* may not be considered objects of interest by the neural network model 260 (e.g., the street lights 382*a*-382*d* may not have a significant impact on white balance gain levels). The motorcycle 386 may be on a left side of the video frame 252*b* and the motorcycle 388 may be on a right side of the video frame 252*b*. While the CNN 190*b* may be configured to determine that the motorcycle 386 may be located farther away from the lens 160 of the capture device 104 than the motorcycle 388, the neural network model 260 implemented to detect objects and/or determine characteristics of objects may not provide a benefit to determining the auto white balance by calculating distances (e.g., distance calculations may be skipped in order to prevent unnecessary calculations).

Bounding boxes 400-408 are shown. The bounding boxes 400-408 may be similar to the bounding boxes 330-344 described in association with FIG. 7. In the example shown, the bounding box 400 may be the region of interest of the road region 380, the bounding box 402 may be the region of interest of the motorcycle 386, the bounding box 404 may be the region of interest of the motorcycle 388, the bounding box 406 may be the region of interest of the tree 392 and a grass region and the bounding box 408 may be the region of interest of the sky region 390. In an example, the settings (e.g., the feature set) for the processor 102 (e.g., the computer vision AI neural network model 260 implemented by the CNN module 190*b*) may define objects of interest to be roads, trees and the sky. The CNN module 190*b* may associate each of the detected objects 400-408 with the tiles 300*aa*-300*nn* that the objects occupy.

In the example shown, the detected object 400 (e.g., the roadway 380) may correspond to at least sixteen tiles (e.g., the tiles 300*fc*-300*ff*, the tiles 300*gc*-300*gf* and the tiles 300*ma*-300*mn*), the detected object 402 (e.g., the motorcycle 386) may correspond to at least six tiles (e.g., the tiles 300*ea*-300*eb*, the tiles 300*fa*-300*fb* and the tiles 300*ga*-300*gb*), the detected object 404 (e.g., the motorcycle 388) may correspond to at least three tiles (e.g., the tile 300*eg*, the tile 300*fg*, and the tile 300*gg*), the detected object 406 (e.g., the tree 392 and grass region) may correspond to at least eleven tiles (e.g., the tiles 300*ag*-300*an*, the tiles 300*bg*-300*bn*, the tiles 300*cg*-300*cn*, the tiles 300*dg*-300*dn*, the tile 300*en*, the tile 300*fn* and the tile 300*gn*) and the detected object 408 (e.g., the sky region 390) may correspond to at least twenty-eight tiles (e.g., the tiles 300*aa*-300*af*, the tiles 300*ba*-300*bf*, the tiles 300*ca*-300*cf*, the tiles 300*da*-300*df* and the tiles 300*ec*-300*ef*). The street lights 382*a*-382*d* may be ignored by the neural network model 260 in the sky region 390. For example, the shape and size of the street lights 382*a*-382*d* may have an insignificant effect on the white balance gain levels compared to the sky region 390. Even though the streetlights 382*a*-382*d* extend into the sky region 390, the streetlights 382*a*-382*d* may be ignored in terms of an object weight value for white balance gain level.

Figure 9:
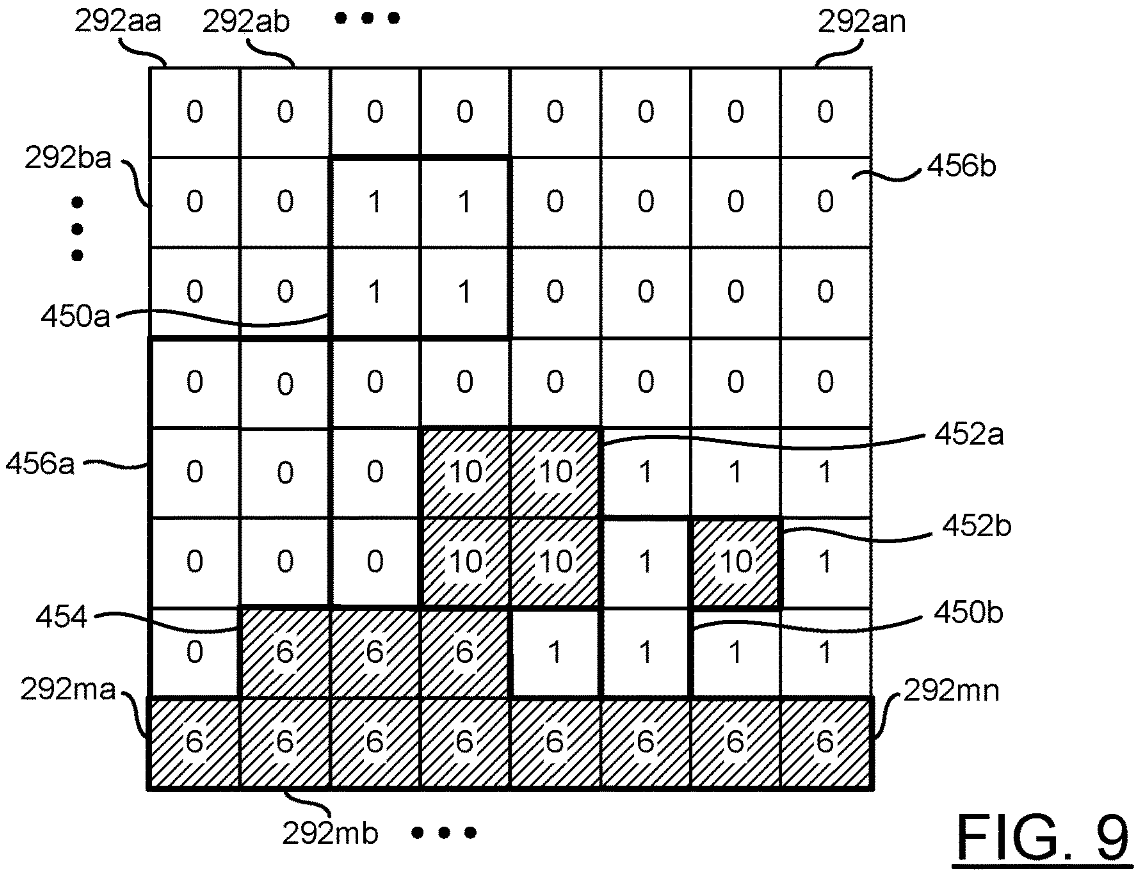
FIG. 9 is a diagram illustrating object weight values generated for the example video frame with road and cloud region object types.

Referring to FIG. 9, a diagram illustrating object weight values generated for the example video frame with road and cloud region object types is shown. An example of the generation of the weight value table 284*a* is shown. The generation of the example weight value table 284*a* may correspond to object weight values determined in response to the characteristics of the objects detected in the video frame 252*a* shown in association with FIG. 7.

The object weight value table 284*a* may comprise the object weight values 292*aa*-292*mn* as shown in association with FIG. 6. Each of the object weight values 292*aa*-292*mn* may correspond with a respective one of the tiles 300*aa*-300*mn* of the video frame 252*a*. The object weight value table 284*a* may be generated by the weight table module 256 in response to the signal OBJ presented by the CNN module 190*b*. In one example, a fixed weight value table may be generated by the default tables module 262 as the object weight value table 284*a* when no objects have been detected in the analyzed one of the video frames 252*a*-252*n* (e.g., a weight value of 1 may be applied to each of the object weight values 292*aa*-292*mn*). In the example shown, since the objects 330-344 have been detected in the video frame 252*a*, the object weight values 292*aa*-292*mn* may be set to a default value of 1 and increased, decreased, or may be unchanged by the table generation module 264 in response to the characteristics of the objects 330-344.

Groups of neutral object weight values 450*a*-450*b*, groups of highest object weight values 452*a*-452*b*, a group of increased object weight values 454 and groups of decreased object weight values 456*a*-456*b* are shown in the object weight table 284*a*. The group of neutral object weight values 450*a* may comprise the object weight values 292*bc*-292*bd* and the object weight values 292*cc*-292*cd*, which may correspond to the tiles 300*bc*-300*bd* and the tiles 300*cc*-300*cd* of the object 338 in the video frame 252*a*. The group of neutral object weight values 450*b* may comprise the object weight value 292*ff* and the object weight value 292*gf*, which may correspond to the tile 300*ff* and the tile 300*gf* of the object 340 in the video frame 252*a*. For example, each of the object weight values 292*aa*-292*mn* may have a value of 1 and the neutral object weight values may be kept at a value of 1 even through some objects have been detected (e.g., types of objects that do not have a significant impact on the white balance gain calculation).

The group of highest object weight values 452*a* may comprise the object weight values 292*ed*-292*ee* and the object weight values 292*fd*-292*fe*, which may correspond to the tiles 300*ed*-300*ee* and the tiles 300*fd*-300*fe* of the object 332 in the video frame 252*a*. The group of highest object weight values 452*b* may comprise the object weight value 292*fg*, which may correspond to the tile 300*fg* of the object 334 in the video frame 252*a*. The group of increased object weight values 454 may comprise the object weight values 292*gb*-292*gd* and the object weight values 292*ma*-292*mn*, which may correspond to the tiles 300*gb*-300*gd* and the tiles 300*ma*-300*mn* of the object 330 in the video frame 252*a*. The group of decreased object weight values 456*a* may comprise the object weight values 292*da*-292*db*, the object weight values 292*ea*-292*eb*, the object weight values 292*fa*-292*fb* and the object weight value 292*ga*, which may correspond to the tiles 300*da*-300*db*, the tiles 300*ea*-300*eb*, the tiles 300*fa*-300*fb* and the tile 300*ga* of the object 336 in the video frame 252*a*. The group of decreased object weight values 456*b* may comprise the object weight values 292*aa*-292*an*, the object weight values 292*ba*-292*bb*, the object weight values 292*be*-292*bn*, the object weight values 292*ca*-292*cb*, the object weight values 292*ce*-292*cn*, the object weight values 292*dc*-292*dn*, the object weight value 292*ec* and the object weight value 292*fc* which may correspond to the tiles 300*aa*-300*an*, the tiles 300*ba*-300*bb*, the tiles 300*be*-300*bn*, the tiles 300*ca*-300*cb*, the tiles 300*ce*-300*cn*, the tiles 300*dc*-300*dn*, the tile 300*ec* and the tile 300*fc* of the objects 342-344 in the video frame 252*a*. For example, each of the object weight values 292*aa*-292*mn* may have a value of 1 except for the weight values that correspond to the locations of the objects 330, 332, 334, 336, 342 and 344 in the video frame 252*a* (e.g., the object weight values 292*aa*-292*mn* in the groups of highest object weight values 452*a*-452*b*, the group of increased object weight values 454 and the group of decreased object weight values 456*a*-456*b*).

The table generation module 264 may select the object weight values for each of the groups of highest object weight values 452*a*-452*b*, the group of increased object weight values 454 and the group of decreased object weight values 456*a*-456*b* in response to the respective classification of the objects 330-344. In the example shown, each of the object weight values 292*aa*-292*mn* in one of the groups of highest object weight values 452*a*-452*b*, the group of increased object weight values 454 and/or the groups of decreased object weight values 456*a*-456*b* may comprise a single object weight value that applies to each object weight value in the group of object weight values (e.g., one weight value for all locations that correspond to the same object). In some embodiments, each of the object weight values 292*aa*-292*mn* in one of the groups of highest object weight values 452*a*-452*b*, the group of increased object weight values 454 and/or the groups of decreased object weight values 456*a*-456*b* may comprise different object weight values based on different sub-regions of an object (e.g., an road detected may have a lower object weight value in locations that correspond to the detection of a pedestrian).

In the example shown, the cloud object 332 and the cloud object 334 may have an object weight value of 10, the roadway object 330 may have an object weight value of 6, the tree region object 336 may have an object weight value of 0 and the sky region objects 342-344 may have an object weight value of 0. For example, the neural network model 260 may be configured to select the bright clouds as the highest priority object, roads as the second highest priority and the sky region and tree region as the lowest priority out of the objects detected. Other combinations of prioritization may be implemented according to the design criteria of a particular implementation. Based on the object weight values assigned for the object classifications detected, the 292*ed*-292*ee* and the object weight values 292*fd*-292*fe* and the object weight value 292*fg* may be assigned a value of 10 (e.g., for the groups of highest object weight values 452*a*-452*b*), the object weight values 292*gb*-292*gd* and the object weight values 292*ma*-292*mn* may be assigned a value of 6 (e.g., for the group of increased object weight values 454), the object weight values 292*da*-292*db*, the object weight values 292*ea*-292*eb*, the object weight values 292*fa*-292*fb*, the object weight value 292*ga*, the object weight values 292*aa*-292*an*, the object weight values 292*ba*-292*bb*, the object weight values 292*be*-292*bn*, the object weight values 292*ca*-292*cb*, the object weight values 292*ce*-292*cn*, the object weight values 292*dc*-292*dn*, the object weight value 292*fc* and the object weight value 292*gc* may be assigned a value of 0 (e.g., for the groups of decreased object weight values 456*a*-456*b*).

The object weight values 292*aa*-292*mn* in the object weight table 284*a* may be generated by the table generation module 264. The object weight table 284*a* may be communicated as the signal AWBWGT by the weight table module 256 to the AWB module 258. The AWB module 258 may use the object weight table 284*a* and the white balance gain value table 282*a* in order to calculate the AWB adjustment for the video frame 252*a*. The object weight table 284*a* and the white balance value table 282*a* may be used for the video frame 252*a* alone. Additional object weight tables and additional white balance gain value tables may be calculated for other of the video frames 252*b*-252*n*.

Figure 10:
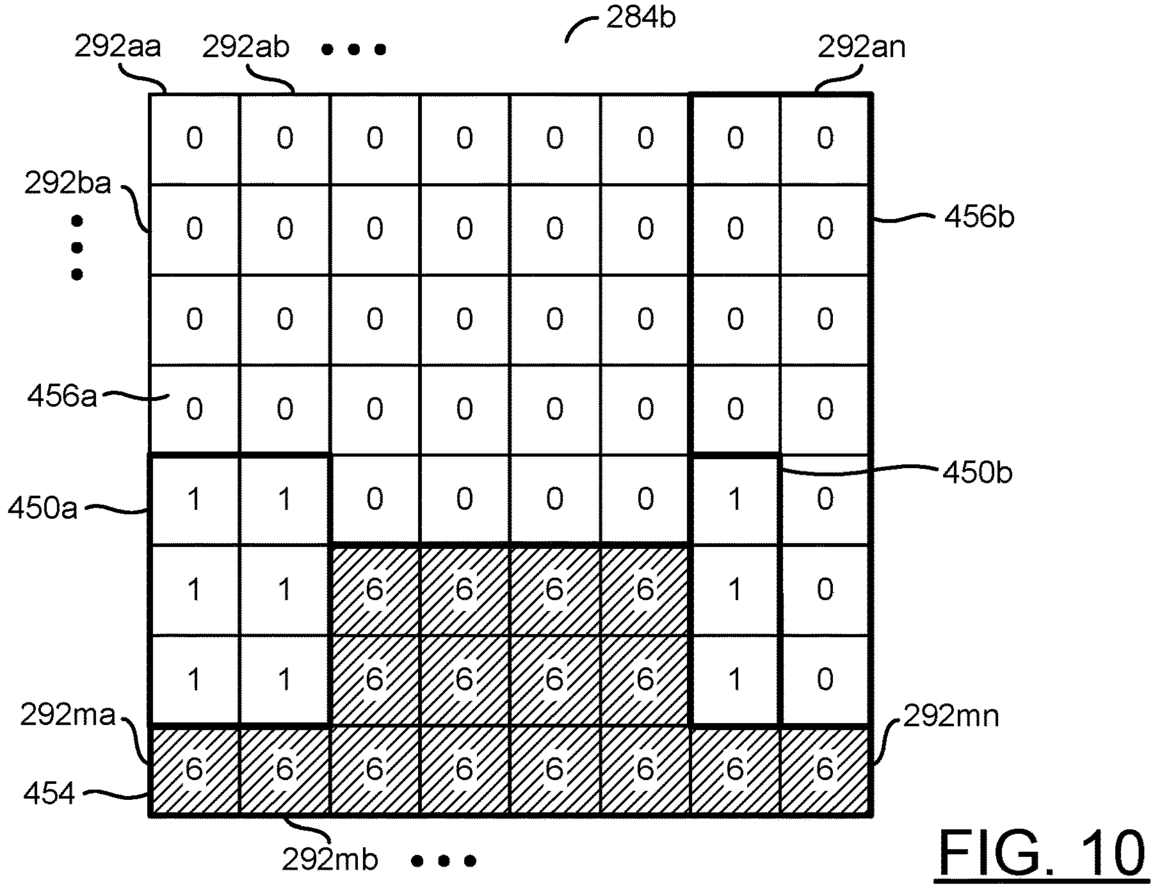
FIG. 10 is a diagram illustrating object weight values generated for the example video frame with sky and tree region object types.

Referring to FIG. 10, a diagram illustrating object weight values generated for the example video frame with sky and tree region object types is shown. An example of the generation of the weight value table 284*b* is shown. The generation of the example weight value table 284*b* may correspond to object weight values determined in response to the characteristics of the objects detected in the video frame 252*b* shown in association with FIG. 8. Similar to the object weight value table 284*a* shown in association with FIG. 9, the object weight value table 284*b* may comprise the object weight values 292*aa*-292*mn* (determined from the characteristics in the signal OBJ) that each correspond to a respective one of the tiles 300*aa*-300*mn* of the video frame 252*b*.

Groups of neutral object weight values 450*a*-450*b*, a group of increased object weight values 454 and groups of decreased object weight values 456*a*-456*b* are shown in the object weight table 284*b*. The group of neutral object weight values 450*a* may comprise the object weight values 292*ea*-292*eb*, the object weight values 292*fa*-292*fb* and the object weight values 292*ga*-292*gb*, which may correspond to the tiles 300*ea*-300*eb*, the tiles 300*fa*-300*fb* and the tiles 300*ga*-300*gb* of the object 402 in the video frame 252*b*. The group of neutral object weight values 450*b* may comprise the object weight value 292*eg*, the object weight value 292*fg* and the object weight value 292*gg*, which may correspond to the tile 300*eg*, the tile 300*fg*, and the tile 300*gg* of the object 404 in the video frame 252*b*. For example, each of the object weight values 292*aa*-292*mn* may have a value of 1 and the object weight values in the groups of neutral object weight values 450*a*-450*b* may be ignored by keeping the object weight values at the value of 1.

The group of increased object weight values 454 may comprise the object weight values 292*fc*-292*ff*, the object weight values 292*gc*-292*gf* and the object weight values 292*ma*-292*mn*, which may correspond to the tiles 300*fc*-300*ff*, the tiles 300*gc*-300*gf* and the tiles 300*ma*-300*mn* of the object 400 of the video frame 252*b*. The group of decreased object weight values 456*a* may comprise the object weight values 292*aa*-292*af*, the object weight values 292*ba*-292*bf*, the object weight values 292*ca*-292*cf*, the object weight values 292*da*-292*df* and the object weight values 292*ec*-292*ef*, which may correspond to the tiles 300*aa*-300*af*, the tiles 300*ba*-300*bf*, the tiles 300*ca*-300*cf*, the tiles 300*da*-300*df* and the tiles 300*ec*-300*ef* of the object 408 of the video frame 252*b*. The group of decreased object weight values 456*b* may comprise the object weight values 292*ag*-292*an*, the object weight values 292*bg*-292*bn*, the object weight values 292*cg*-292*cn*, the object weight values 292*dg*-292*dn*, the object weight value 292*en*, the object weight value 292*fn* and the object weight value 292*gn*, which may correspond to the tiles 300*ag*-300*an*, the tiles 300*bg*-300*bn*, the tiles 300*cg*-300*cn*, the tiles 300*dg*-300*dn*, the tile 300*en*, the tile 300*fn* and the tile 300*gn* of the object 406 of the video frame 252*b*. For example, each of the object weight values 292*aa*-292*mn* may have a value of 1 except for the weight values that correspond to the locations of the object 400, the object 406 and the object 408 in the video frame 252*b* (e.g., the object weight values 292*aa*-292*mn* in the group of increased object weight values 454 and the groups of decreased object weight values 456*a*-456*b*).

For the example video frame 252*b*, the object classification for the object 406 may be the same as the decreased object weight value (e.g., the tree 392 may be de-emphasized). In the example shown, the roadway object region may have the object weight value of 6, the tree object region may have an object weight value of 0, and the sky object region may have the object weight value of 0. Based on the object weight values assigned for the object classifications detected, the object weight values 292*fc*-292*ff*, the object weight values 292*gc*-292*gf* and the object weight values 292*ma*-292*mn* may be assigned a value of 6 (e.g., for the group of increased object weight values 454), and the object weight values 292*ag*-292*an*, the object weight values 292*bg*-292*bn*, the object weight values 292*cg*-292*cn*, the object weight values 292*dg*-292*dg*, the object weight value 292*en*, the object weight value 292*fn* and the object weight value 292*gn*, the object weight values 292*aa*-292*af*, the object weight values 292*ba*-292*bf*, the object weight values 292*ca*-292*cf*, the object weight values 292*da*-292*df* and the object weight values 292*ec*-292*ef* may be assigned a value of 0 (e.g., for the groups of decreased object weight values 456*a*-456*b*).

In the object weight table 284*a* and the object weight table 284*b*, even though the two objects may have the same classification (e.g., the roadway regions may have a value of 6), the size of the road regions may be different. For example, the roadway object 330 in the video frame 252*a* may have fewer tiles (e.g., 11) than the roadway object 400 in the video frame 252*b* (e.g., 16). The AWB module 258 may determine the AWB adjustment for the video frame 252*b* using the white balance gain table 282*b* and the object weight table 284*b*, and the larger size of the roadway object 400 may be accounted for based on the number of the object weight values that contain the roadway object 400. In the AWB adjusted output signal AWBFRAME, the region of the AWB adjusted video frame that corresponds to the roadway 380 (e.g., the detected object 400) may have higher priority for AWB gain value than the region of the AWB adjusted video frame that corresponds to the roadway 304 (e.g., the detected object 330) due to the difference in size (e.g., proportion of the video frame).

Figure 11:
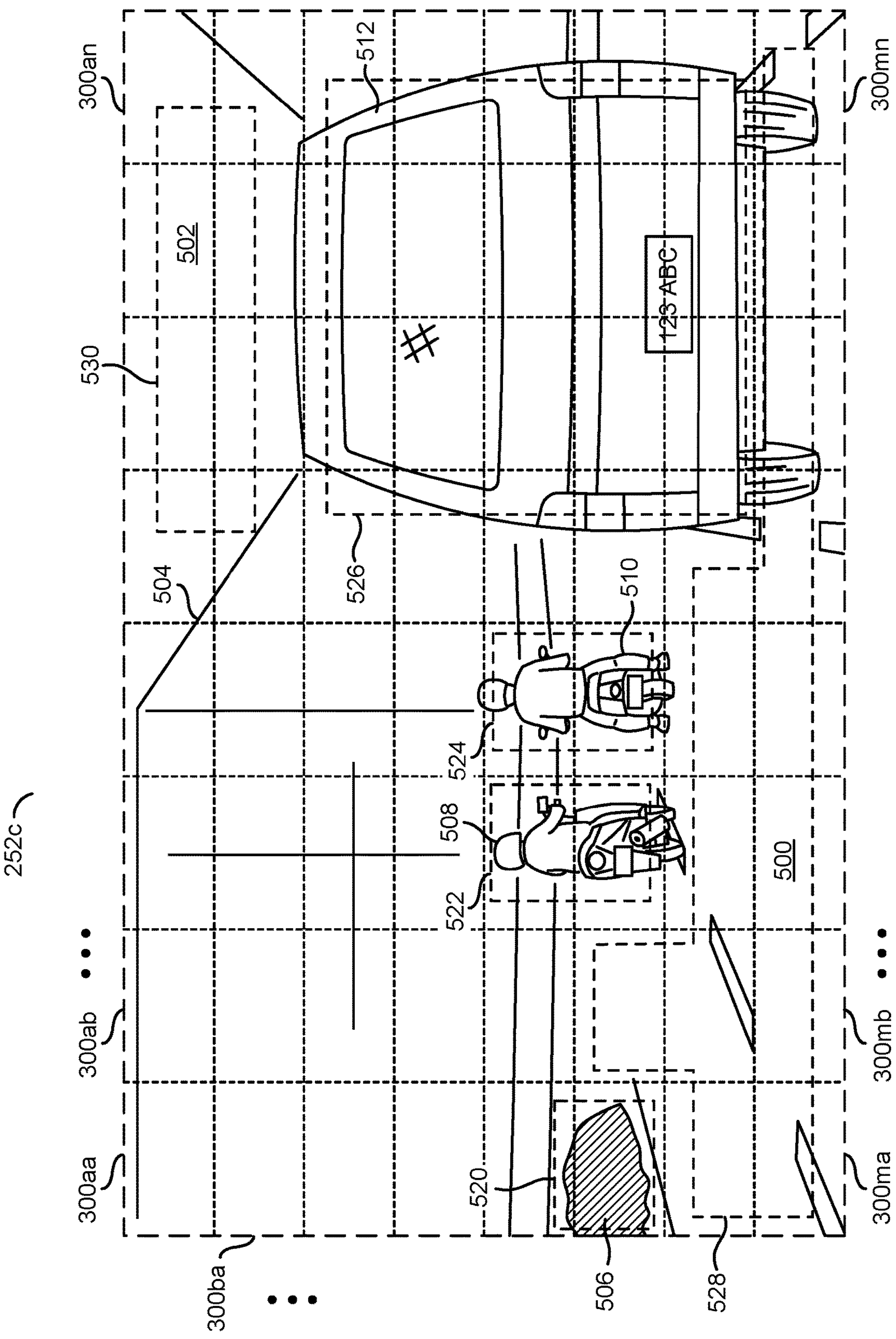
FIG. 11 is a diagram illustrating a detection of neutral objects and road object regions in an example video frame.

Referring to FIG. 11, a diagram illustrating a detection of neutral objects and road object regions in an example video frame is shown. The example video frame 252*c* may be one of the video frames 252*a*-252*n* processed by the processor 102. Similar to the example video frame 252*a* shown in association with FIG. 7, the example video frame 252*c* may be an illustrative example of one video frame of a sequence of the video frames 252*a*-252*n* analyzed/evaluated by the CNN module 190*b* and/or the neural network model 260.

Similar to the example video frame 252*a*, the example video frame 252*c* may be divided into the tiles 300*aa*-300*mn*. The CNN module 190*b* may be configured to analyze the pixel data of the video frame 252*c* to detect objects of interest and/or determine characteristics of the objects of interest detected (e.g., a size, a location, a distance, a classification, etc. of various types of objects/subjects) in the video frame 252*c*. The example video frame 252*c* may be a video frame captured of an outdoor roadway area (e.g., a view from the camera systems 100 implementing the capture device 104).

The example video frame 252*c* may comprise various objects. Not all of the objects in the example video frame 252*c* may be determined to be an object of interest by the neural network model 260 for the purposes of the auto-white balance gain calculation. The example video frame 252*c* may comprise a roadway 500, a sky region 502, a building 504, a snow mound 506, motorcycles 508-510 and/or a vehicle 512. Generally, foreground objects may not be objects of interest that the computer vision operations may detect to determine auto-white balance. For example, the motorcycles 508-510 and/or the vehicle 512 may not be considered objects of interest by the neural network model 260. One or more of the motorcycles 508-510 and/or the vehicle 512 may affect the white balance gain calculation based on a color and/or amount of light reflected. For example, the vehicle 512 is close to the lens 160 and occupies a large region of the video frame 252*c*. Light reflecting off the vehicle 512 could affect the auto-white balance calculations in some conditions.

Bounding boxes 520-530 are shown. The bounding boxes 520-530 may be similar to the bounding boxes 330-344 described in association with FIG. 7. In the example shown, the bounding box 520 may be the region of interest of the snow mound 506, the bounding box 522 may be the region of interest of the motorcycle 508, the bounding box 524 may be the region of interest of the motorcycle 510, the bounding box 526 may be the region of interest of the vehicle 512, the bounding box 528 may be the region of interest for the road region 500 and/or the bounding box 530 may be the region of interest for the sky region 502. In an example, the settings (e.g., the feature set) for the processor 102 (e.g., the computer vision AI neural network model 260 implemented by the CNN module 190*b*) may define objects of interest to be the road, snow and sky regions. The CNN module 190*b* may associate each of the detected objects 520-530 with the tiles 300*aa*-300*mn* that the objects occupy. In the example shown, the detected object 520 (e.g., the snow mound 506) may correspond to two tiles (e.g., the tile 300*ea* and the tile 300*fa*). In the example shown, the detected object 522 (e.g., the motorcycle 508) may correspond to 2 tiles (e.g., the tile 300*ec* and the tile 300*fc*). In the example shown, the detected object 524 (e.g., the motorcycle 510) may correspond to 2 tiles (e.g., the tile 300*ed* and the tile 300*fd*). In the example shown, the detected object 526 (e.g., the vehicle 512) may correspond to 20 tiles (e.g., the tiles 300*ce*-300*cn*, the tiles 300*de*-300*dn*, the tiles 300*ee*-300*en*, the tiles 300*fe*-300*fn* and the tiles 300*ge*-300*gn*). In the example shown, the detected object 528 (e.g., the roadway region 500) may correspond to 13 tiles (e.g., the tile 300*fb*, the tiles 300*ga*-300*gd* and the tiles 300*ma*-300*mn*). In the example shown, the detected object 530 (e.g., the sky region 502) may correspond to 8 tiles (e.g., the tiles 300*ae*-300*an* and the tiles 300*be*-300*bn*).

Figure 12:
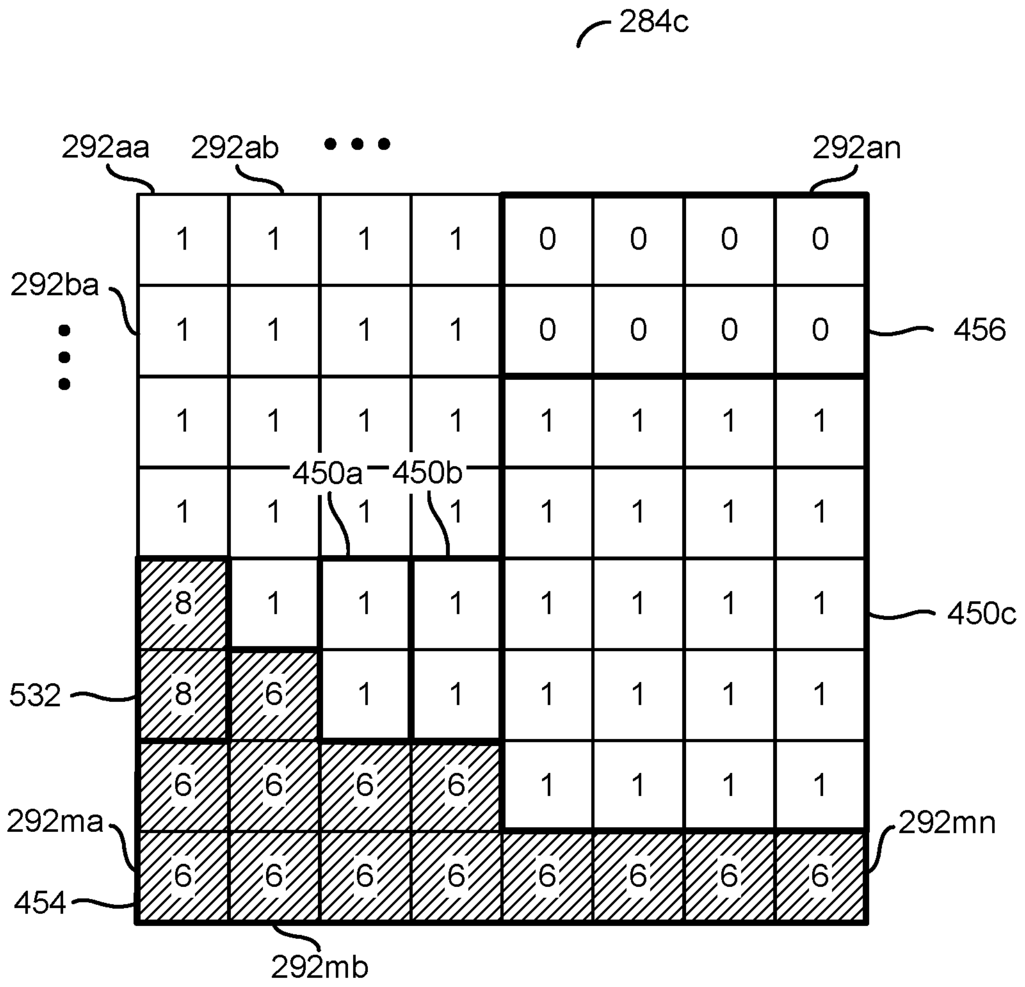
FIG. 12 is a diagram illustrating object weight values generated for the example video frame with neutral objects and road object types.

Referring to FIG. 12, a diagram illustrating object weight values generated for the example video frame with neutral objects and road object types is shown. An example of the generation of the weight value table 284*c* is shown. The generation of the example weight value table 284*c* may correspond to object weight values determined in response to the characteristics of the objects detected in the video frame 252*c* shown in association with FIG. 11. Similar to the object weight value table 284*a* shown in association with FIG. 9, the object weight value table 284*c* may comprise the object weight values 292*aa*-292*mn* (determined from the characteristics in the signal OBJ) that each correspond to a respective one of the tiles 300*aa*-300*mn* of the video frame 252*c*.

Groups of neutral object weight values 450*a*-450*c*, a group of increased object weight values 454, a group of decreased object weight values 456, and a group of high object weight values 532 are shown in the object weight table 284*c*. The group of neutral object weight values 450*a* may comprise the object weight value 292*ec* and the object weight value 292*fc*, which may correspond to the tile 300*ec* and the tile 300*fc* of the object 522 in the video frame 252*c*. The group of neutral object weight values 450*b* may comprise the object weight value 292*ed* and the object weight value 292*fd*, which may correspond to the tile 300*ed* and the tile 300*fd* of the object 524 in the video frame 252*c*. The group of neutral object weight values 450*c* may comprise the object weight values 292*ce*-292*cn*, the object weight values 292*de*-292*dn*, the object weight values 292*ee*-292*en*, the object weight values 292*fe*-292*fn* and the object weight values 292*ge*-292*gn*, which may correspond to the tiles

300*ce*-300*cn*, the tiles 300*de*-300*dn*, the tiles 300*ee*-300*en*, the tiles 300*fe*-300*fn* and the tiles 300*ge*-300*gn* of the object 526 in the video frame 252*c*. For example, each of the object weight values 292*aa*-292*mn* may have a value of 1 and the object weight values in the groups of neutral object weight values 450*a*-450*c* may be ignored by keeping the object weight values at the value of 1. In the example shown, the building 504 may not be one of the detected objects. The region of the object weight value table 284*c* that corresponds to the region of the video frame 252*c* that may be occupied by the building 504 may also have an object weight value of 1 (e.g., the object is ignored). For example, the building 504 and the detected objects 522-526 may each be ignored using by assigning the object weight value of 1. In an example, the detected objects 522-526 may be detected for other functionality (e.g., per-lane traffic detection).

The group of increased object weight values 454 may comprise the object weight value 292*fb*, the object weight values 292*ga*-292*gd* and the object weight values 292*ma*-292*mn*, which may correspond to the tile 300*fb*, the tiles 300*ga*-300*gd* and the tiles 300*ma*-300*mn* of the object 528 of the video frame 252*c*. The group of decreased object weight values 456 may comprise the object weight values 292*ae*-292*an* and the object weight values 292*be*-292*bn*, which may correspond to the tiles 300*ae*-300*an* and the tiles 300*be*-300*bn* of the object 530 of the video frame 252*c*. A group of high object weight values 532 may comprise the object weight value 292*ea* and the object weight value 292*fa*, which may correspond to the tile 300*ea* and the tile 300*fa* of the object 520 in the video frame 252*c*. For example, each of the object weight values 292*aa*-292*mn* may have a value of 1 except for the weight values that correspond to the locations of the object 520, the object 528 and the object 530 in the video frame 252*c* (e.g., the object weight values 292*aa*-292*mn* in the group of increased object weight values 454, the group of decreased object weight values and the group of high object weight values 532).

For the example video frame 252*c*, the object classification for the objects 522-526 may be the same (e.g., objects may be classified as vehicles) and the classification of the object 520, the object 528 and the object 530 may be different (e.g., the road region 500 and the snow mound 506 may be increased and the sky region 502 may be decreased). In the example shown, the motorcycle objects 522-524 may have the same object weight value of 1 and the same number of tiles affected (e.g., two tiles for objects of the same size). The vehicle object 526 may also have the same weight value of 1 but affect a larger region (e.g., a larger size object). In the example shown, the snow mound object 520 may have a higher weight value of 8 compared to the weight value 6 of the road region 500, but the road region may affect a larger portion of the video frame 252*c*. Based on the object weight values assigned for the object classifications detected, the object weight value 292*fb*, the object weight values 292*ga*-292*gd* and the object weight values 292*ma*-292*mn* (e.g., for the group of increased object weight values 454) may be assigned a value of 6, the object weight value 292*ea* and the object weight value 292*fa* (e.g., for the group of high object weight value 532) may be assigned a value of 8, while the object weight values 292*ae*-292*an* and the object weight values 292*be*-292*bn* (e.g., for the group of decreased object weight values 456) may be assigned a value of 0.

In the object weight table 284*c*, even though the neutral objects 522-524 have the same size and the larger neutral object 526 have different sizes, the effect on the object weight table 284*c* may be the same, since the objects are ignored based on the settings of the neural network model 260. The size of each object may be accounted for the in the AWB adjustment based on the number of the tiles 300*aa*-300*mn* that each of the detected objects 520-530 occupies. However, even a large object may not provide a significant difference to the object weight values if the object type is ignored (e.g., the motorcycles and vehicles). Differences in sizes may significantly impact the auto-white balance calculations for objects that are assigned different (e.g., increased or decreased) weights such as a road region, a tree region, a sand region, a snow region, a cloud, the sky region, etc.

The neural network model 260 may be configured to detect particular objects and/or characteristics of objects. The objects detected and/or classified may comprise particular types of regions (e.g., large portions of an environment). The regions may comprise one or more of a sky region, a road region, a muddy region, a grassy region, trees and/or vegetation, a snowy region, a sandy region (e.g., a desert), etc. The particular regions may be determined to disproportionately affect the white balance in an image and/or video frame. Various regions may be emphasized and/or de-emphasized in order to generate video frames that may have a more natural light balance (e.g., a balance of the color temperature throughout the image and/or video frame that accurately resembles the actual environment that was captured). Light sources may be normally oversaturated. For example, objects that are light sources (e.g., the sun, the moon, candles, vehicle headlights, light bulbs, etc.) may not be provided special weight values (e.g., weight values that are increased or decreased). In one example, clouds may be the best object for calculating the white balance gain. In the example shown in FIG. 9, clouds may be given the highest available object weight value. Snow may be another object type that provides a very good reference for calculating white balance gain. Roads may be a suitable object type for calculating the white balance gain, but there may be some variance due to the particular material(s) used in the makeup of the road. Generally, objects that provide an accurate color temperature reference in various color temperature environments may be emphasized by increasing the object weight values. The neural network 260 may be configured to detect objects that have characteristics of various object types that provide a good and/or accurate reference for calculating the white balance for the video frames 252*a*-252*n*.

Similarly, some objects that provide unnaturally high color temperature or unnaturally low color temperatures may provide an incorrect reference for white balance calculations. In an example, the sky region may provide similar white balance statistic values as white objects in high color temperature environments, which lead to incorrect white balance calculations. In another example, trees, grass and/or mud may provide similar white balance statistic values as white objects in low color temperature values, which may lead to incorrect white balance calculations. Objects and/or object regions that lead to incorrect white balance gain calculations in particular color temperature environments may be de-emphasized in the auto-white balance calculation by decreasing the object weight value to zero. The neural network 260 may be configured to detect objects that have characteristics of various object types that provide an incorrect reference for calculating the white balance for the video frames 252*a*-252*n*.

The auto-white balanced video frames (e.g., presented in the signal AWBFRAME may be generated that have an accurate white balance (e.g., a color temperature range that accurately resembles the real-world environment captured).

In the example of FIG. 7, if the influence of the sky region 320 is not ignored in the white balance calculation, then the output video frame may appear to have an unnaturally warm (e.g., red/orange) color temperature. The apparatus 100 may be configured to ignore the influence of the sky and increase the weighting of the road and the clouds to generate a natural looking video frame (e.g., less warm color temperature throughout). In the example of FIG. 8, if the influence of the tree is not ignored and the influence of the road region is not taken into account, then the output video frame may appear to have an unnaturally cold (e.g., blue) color temperature. The apparatus 100 may be configured to ignore the influence of the tree and increase the weighting of the road to generate a natural looking video frame (e.g., less cold color temperature throughout). The type of correction performed (e.g., reducing an amount of warm color temperature or reducing an amount of cold color temperature influence) may depend on the types of objects in the video frame, and/or the influence caused by the particular types of objects in various color temperature environments.

Figure 13:
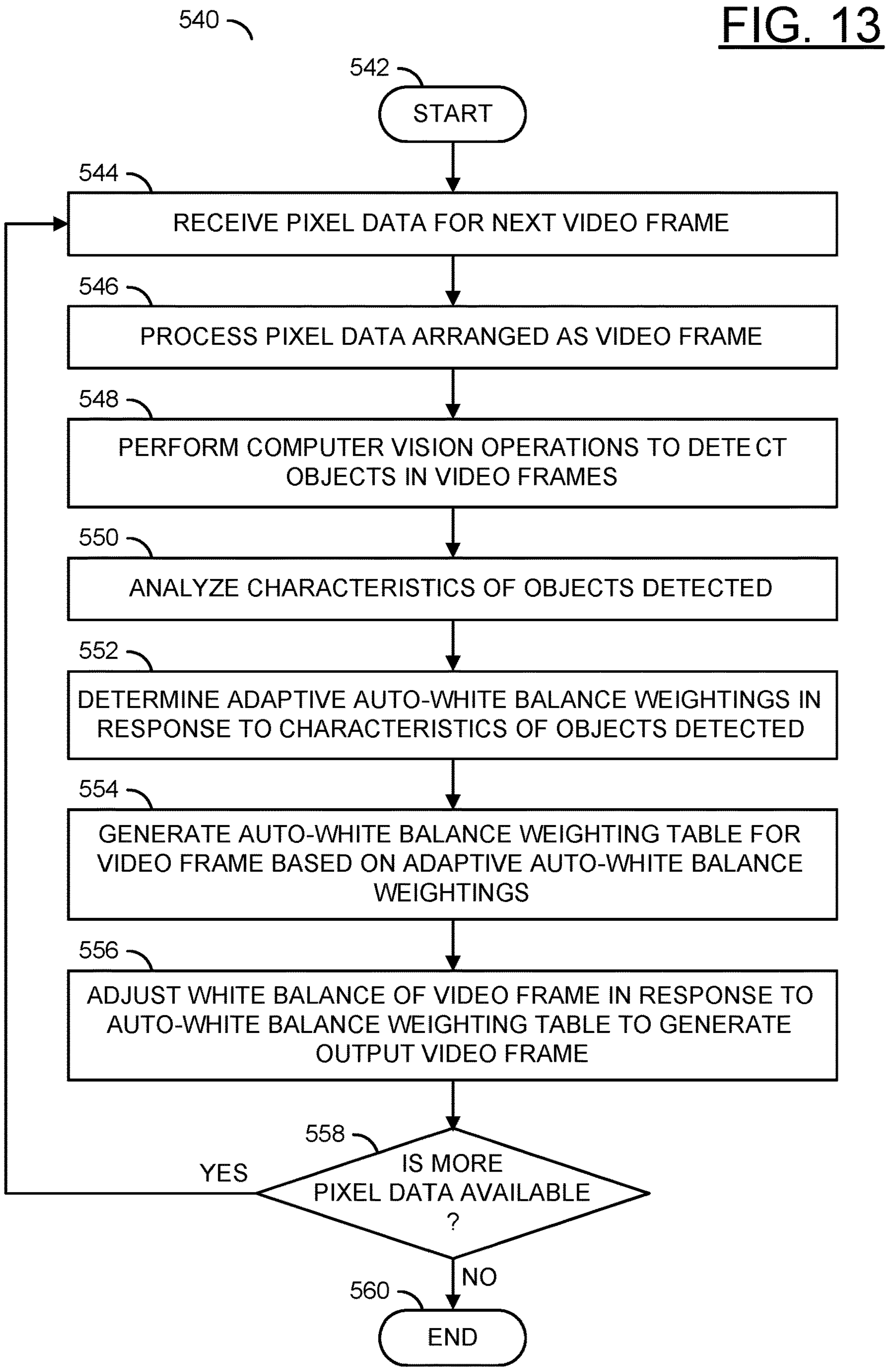
FIG. 13 is a flow diagram illustrating a method for performing object-based auto-white balance using neural network models.

Referring to FIG. 13, a method (or process) 540 is shown. The method 540 may perform object-based auto-white balance using neural network models. The method 540 generally comprises a step (or state) 542, a step (or state) 544, a step (or state) 546, a step (or state) 548, a step (or state) 550, a step (or state) 552, a step (or state) 554, a step (or state) 556, a decision step (or state) 558, and a step (or state) 560.

The step 542 may start the method 540. In the step 544, the processor 102 may receive the pixel data. In an example, the capture device 104 may generate the pixel data in response to the light input signal LIN and generate the signal VIDEO comprising the pixel data. Next, in the step 546, the processor 102 may perform video processing operations to process the pixel data arranged as the video frames 252*a*-252*n*. In the step 548, the processor 102 may perform the computer vision operations to detect objects in the video frame being analyzed. Each of the video frames 252*a*-252*n* may be individually analyzed by the CNN module 190*b* in order to detect the objects of interest. In an example, the video frame 252*a* may be analyzed to detect the objects of interest 330-344. Next, the method 540 may move to the step 550.

In the step 550, the CNN module 190*b* may analyze the characteristics of the objects of interest detected. In an example, the types of objects that are determined to be objects and/or the characteristics detected may be determined according to the neural network model 260 implemented. Next, in the step 552, the weight table module 256 may determine the adaptive auto-white balance weightings in response to the characteristics of the objects detected. In an example, the weightings may comprise the object weight values 292*aa*-292*mn*. In the step 554, the weight table module 256 may generate the auto-white balance weight table for the video frame being analyzed based on the adaptive auto-white balance weightings. In an example, the weight table module 256 may present the signal AWBWGT. Next, in the step 556, the AWB module 258 may automatically adjust the white balance of the video frame in response to the auto-white balance weighting table(s) in order to generate the output video frame AWBFRAME. Next, the method 540 may move to the decision step 558.

In the decision step 558, the processor 102 may determine whether more pixel data is available. For example, the processor 102 may generate AWB weight tables for each of the video frames 252*a*-252*n*. If there is more pixel data available, then the method 540 may return to the step 544. If there is no more pixel data available, then the method 540 may move to the step 560. The step 560 may end the method 540.

Figure 14:
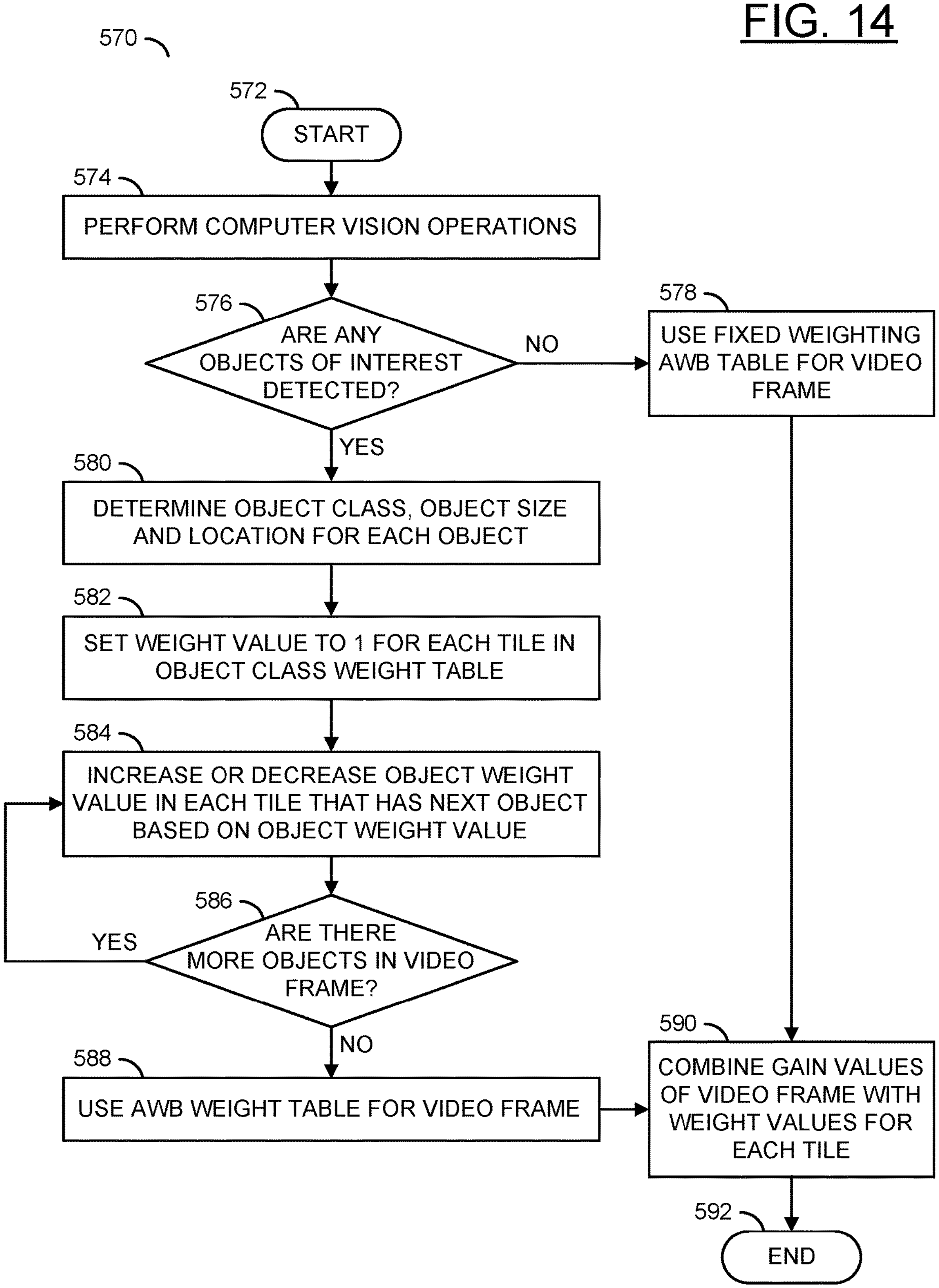
FIG. 14 is a flow diagram illustrating a method for generating an auto-white balance weight table for each video frame.

Referring to FIG. 14, a method (or process) 570 is shown. The method 570 may generate an auto-white balance weight table for each video frame. The method 570 generally comprises a step (or state) 572, a step (or state) 574, a decision step (or state) 576, a step (or state) 578, a step (or state) 580, a step (or state) 582, a step (or state) 584, a decision step (or state) 586, a step (or state) 588, a step (or state) 590, and a step (or state) 592.

The step 572 may start the method 570. In the step 574, the CNN module 190*b* may perform the computer vision operations. Next, in the decision step 576, the CNN module 190*b* may determine whether there are any objects of interest detected. Which objects in the video frames 252*a*-252*n* are determined to be objects of interest (e.g., a sky region might be an object of interest, while a pedestrian might not be an object of interest) may be determined based on the neural network model 260. If there are no objects of interest detected, then the method 570 may move to the step 578. In the step 578, the default tables module 262 may generate a fixed weight AWB table for the current video frame. In an example, the fixed weight AWB table may comprise object weight values of 1 for each tile. Next, the method 570 may move to the step 590.

In the decision step 576, if there are objects of interest in the video frame, then the method 570 may move to the step 580. In the step 580, the CNN module 190*b* may determine the object class, number of tiles that the object occupies and/or the location of each object of interest in the video frame. For example, the CNN module 190*b* may classify the objects. Next, in the step 582, the table generation module 264 may set the weight value to 1 for each tile in the object class weight table 284*i*. In the step 584, the table generation module 264 may increase or decrease the object weight value in each tile that has a next one of the objects based on the object weight value. In an example, the object weight values 292*aa*-292*mn* may be increased or decreased for each of the object weight values 292*aa*-292*mn* that correspond to the group of object weight values (e.g., the groups of increased object weight values, the groups of high object weight values, the groups of decreased object weight values, etc.). Next, the method 570 may move to the decision step 586. In the decision step 586, the table generation module 264 may determine whether there are more objects in the video frame. If there are more objects in the video frame, then the method 570 may return to the step 584 (e.g., increment or decrement weight values for the various groups of object weight values, etc.). If there are no more objects in the video frame, then the method 570 may move to the step 588. In the step 588, the table generation module 264 may use the object weight table 284*i* (e.g., the signal TYPEW) as the AWB weight tables for the video frame 252*i* (e.g., the signal AWBWGT). Next, in the step 590, the AWB module 258 may combine the white balance gain values 290*aa*-290*mn* of the video frame 252*i* with the weight values in each tile of the AWB weight tables to generate the adjusted output video frame AWBFRAME. Next, the method 570 may move to the step 592. The step 592 may end the method 570.

Figure 15:
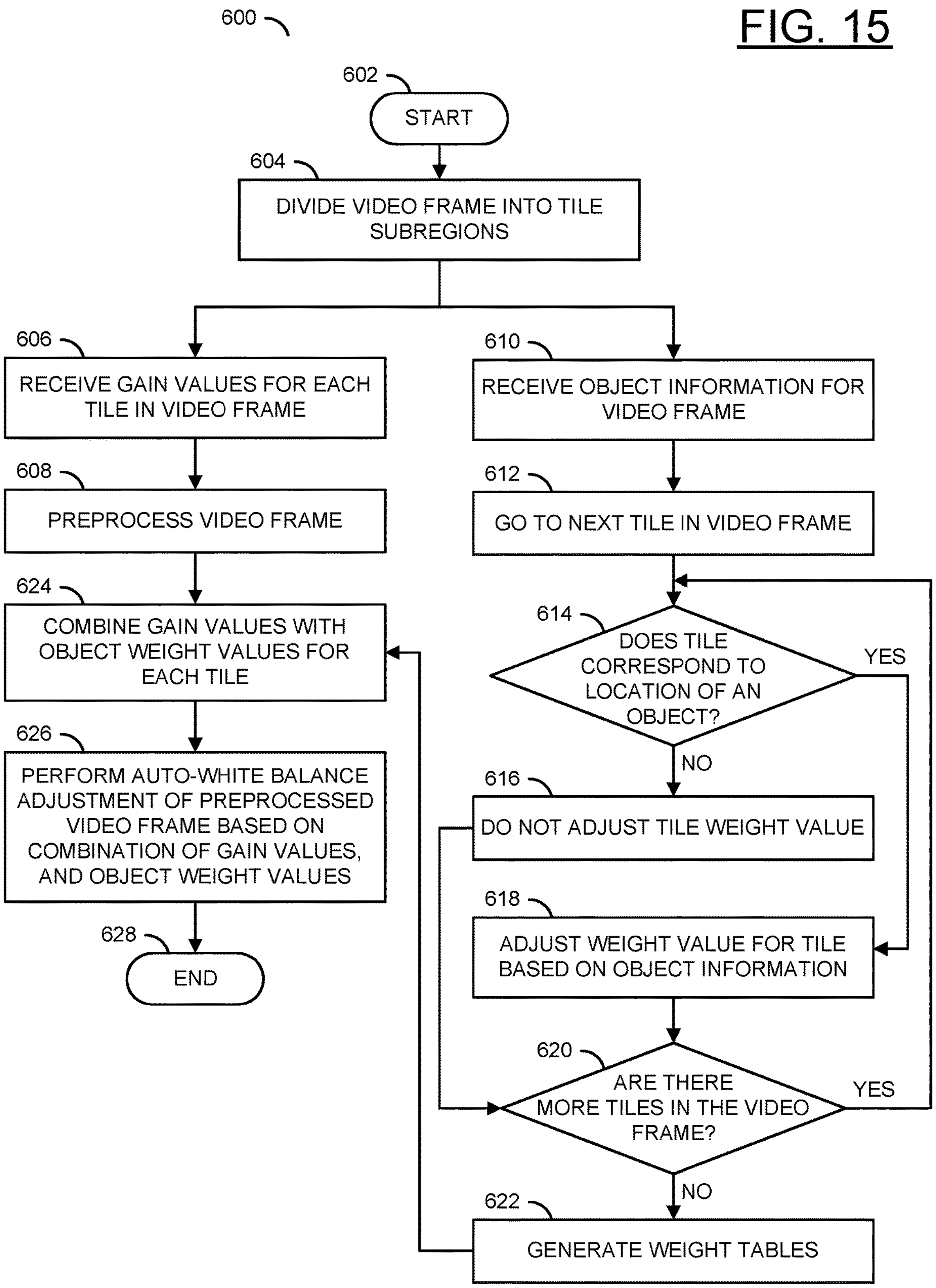
FIG. 15 is a flow diagram illustrating a method for combining white balance gain values with weight table values in each tile of a video frame.

Referring to FIG. 15, a method (or process) 600 is shown. The method 600 may combine white balance gain values with weight table values in each tile of a video frame. The method 600 generally comprises a step (or state) 602, a step (or state) 604, a step (or state) 606, a step (or state) 608, a step (or state) 610, a step (or state) 612, a decision step (or state) 614, a step (or state) 616, a step (or state) 618, a decision step (or state) 620, a step (or state) 622, a step (or state) 624, a step (or state) 626, and a step (or state) 628.

The step 602 may start the method 600. In the step 604, the processor 102 may divide the video frame 252*i* into the tile subregions 300*aa*-300*mn*. The tile subregions 300*aa*-300*mn* may correspond to the white balance gain values 290*aa*-290*mn* and/or the object weight values 292*aa*-292*mn*. Next, the method 600 may move to the step 606 and to the step 610.

In the step 606, the AWB module 258 may receive the white balance gain values 290*aa*-290*mn* for the video frame 252*i* from the ISP 254. Next, in the step 608 the ISP 254 may preprocess the video frame 252*i*. In an example, the AWB module 258 may receive the white balance gain values 290*aa*-290*mn* from the ISP 254 in the signal GAIN, and the preprocessed video frame PPFRAME from the ISP 254 in parallel to the generation of the AWB weight tables. Next, the AWB module 258 may move to the step 624 and wait until the AWB weight tables are generated.

In the step 610, the weight table module 256 may receive the object information for the video frame 252*i* in the signal OBJ from the CNN module 190*b*. Next, in the step 612, the table generation module 264 may go the next one of the tiles 300*aa*-300*mn* in the video frame 252*i*. Next, the method 600 may move to the decision step 614. In the decision step 614, the table generation module 264 may determine whether the tile corresponds to a location of one of the objects of interest. For example, the table generation module 264 may determine whether a current one of the tiles 300*aa*-300*mn* (e.g., location coordinates of a region of the video frame) is a match with one of the tiles with the objects 330-344 in the video frame 252*a*. If the tile does not correspond to one of the objects, then the method 600 may move to the step 616.

In the step 616, the table generation module 264 may not adjust the tile weight value (e.g., for the object weight value). Next, the method 600 may move to the decision step 620. In the decision step 614, if the tile does correspond to one of the objects, then the method 600 may move to the step 618. In the step 618, the table generation module 264 may adjust the weight value that corresponds to the tile based on the object information (e.g., increase or decrease the object weight values 292*aa*-292*mn*). Next, the method 600 may move to the decision step 620.

In the decision step 620, the table generation module 264 may determine whether there are more tiles in the video frame 252*i*. For example, the weight values may be increased or decreased for each of the tiles that correspond to an object. If there are more of the tiles 300*aa*-300*mn* that have not been analyzed, then the method 600 may return to the decision step 614. If all of the tiles 300*aa*-300*mn* have been analyzed (e.g., weight values have been applied to all of the locations that correspond to the tiles 300*aa*-300*mn*), then the method 600 may move to the step 622. In the step 622, the weight table module 256 may generate the weight tables. For example, the object weight table 284*i* may be presented to the AWB module 258 in the signal AWBWGT. Next, the method 600 may move to the step 624. For example, the steps 606-608 may be performed in parallel with and/or substantially in parallel with the steps 610-622.

In the step 624, the AWB module 258 may combine the white balance gain values 290*aa*-290*mn* with the object weight values 292*aa*-292*mn* for each of the tiles 300*aa*-300*mn*. For example, the combination may be performed according to the equation EQ1. Next, in the step 626, the AWB module 258 may perform the AWB adjustment of the preprocessed video frame PPFRAME based on the combination of the white balance gain values 290*aa*-290*mn* with the object weight values 292*aa*-292*mn*. Next, the method 600 may move to the step 628. The step 628 may end the method 600.

Figure 16:
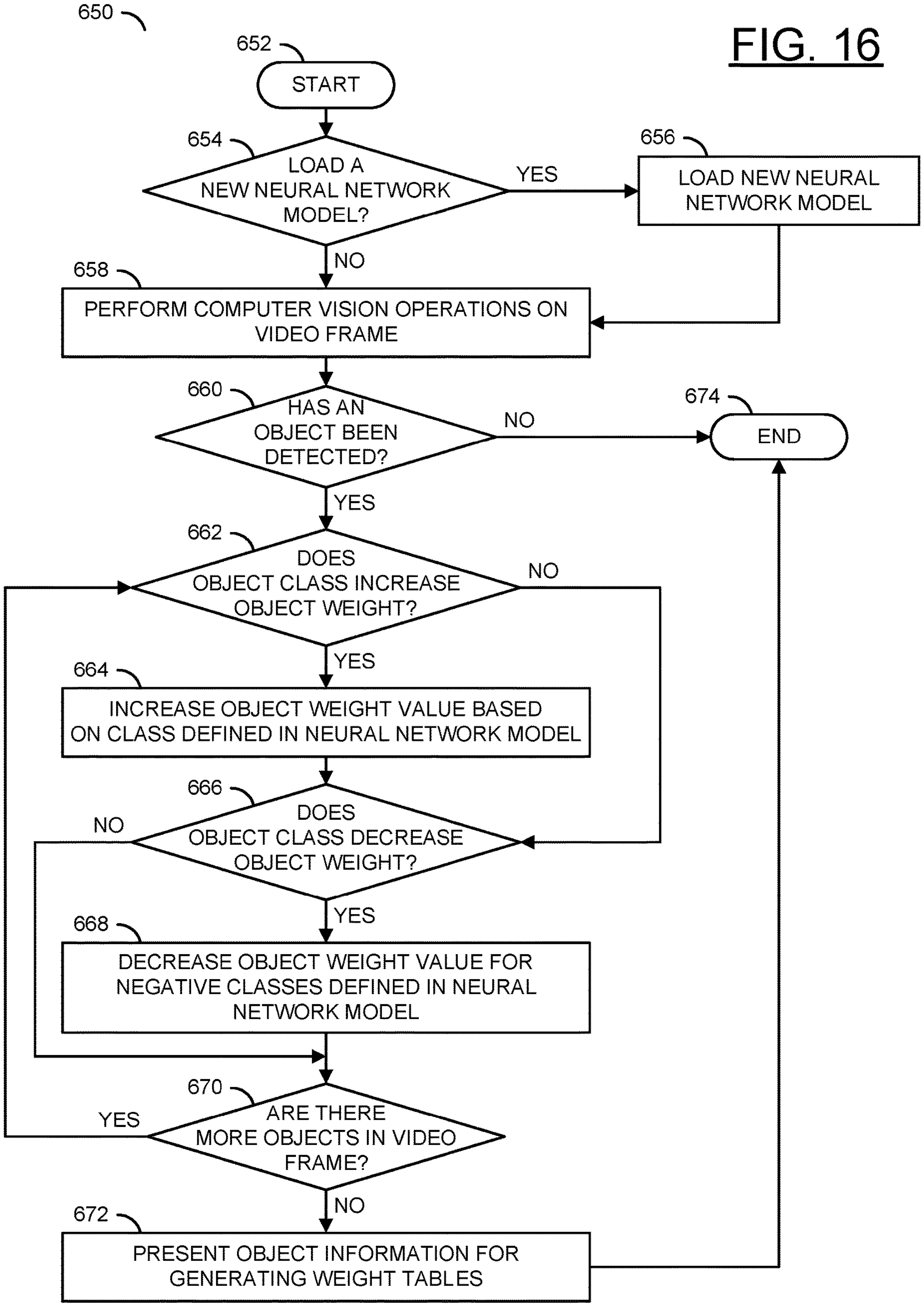
FIG. 16 is a flow diagram illustrating a method for increasing or decreasing object weight values using a neural network model.

Referring to FIG. 16, a method (or process) 650 is shown. The method 650 may increase or decrease object weight values using a neural network model. The method 650 generally comprises a step (or state) 652, a decision step (or state) 654, a step (or state) 656, a step (or state) 658, a decision step (or state) 660, a decision step (or state) 662, a step (or state) 664, a decision step (or state) 666, a step (or state) 668, a decision step (or state) 670, a step (or state) 672, and a step (or state) 674.

The step 652 may start the method 650. In the decision step 654, the processor 102 may determine whether to load a new neural network model 260. In one example, a programmer may load a new neural network model 260. In another example, the apparatus 100 may connect to a network (e.g., via a wired or Wi-Fi connection) and receive updates to the neural network model 260. In yet another example, an end user may select a particular neural network model 260 based on a particular application. For example, one application may be to detect regions in a particular environment (e.g., a snowy environment or a sandy environment). In another example, an updated neural network model 260 may comprise object weight values for other new types of objects and/or regions. If there is a new neural network model 260 to load, then the method 650 may move to the step 656. In the step 656, the processor 102 may update the neural network model 260 in the CNN module 190*b*. Next, the method 650 may move to the step 658. In the decision step 654, if there is no new neural network model, then the method 650 may move to the step 658. In the step 658, the CNN module 190*b* may perform computer vision operations on the video frame 252*i* based on the features and/or definitions in the neural network model 260. Next, the method 650 may move to the decision step 660.

In the decision step 660 the CNN module 190*b* may determine whether an object of interest has been detected. If there are no objects of interest, then the method 650 may move to the step 674. If there are objects of interest, then the method 650 may move to the decision step 662. In the decision step 662, the CNN module 190*b* may determine whether the object class corresponds to an increase for the object weight values 292*aa*-292*mn*. In an example, the CNN module 190*b* may determine the class of the object (e.g., a vehicle, a pedestrian, a building, an animal, a sky region, a road region, snow, desert, trees, grass mud, etc.). For example, the object weight values 292*aa*-292*mn* may be increased for objects that are determined to be a road region, a cloud, a snowy region, etc. If the object class does not correspond to an increase for the object weight values 292*aa*-292*mn*, then the method 650 may move to the decision step 666. If the object class does correspond to an increase for the object weight values 292*aa*-292*mn*, then the method 650 may move to the step 664.

In the step 664, the CNN module 190*b* may increase the object weight value based on the class of the object (e.g., based on the class definition in the neural network model 260). For example, the neural network model 260 may define the object weight value to apply to each class of object. Next, the method 650 may move to the decision step 666. In the decision step 666, the CNN module 190*b* may determine whether the object class corresponds to a decrease for the object weight values 292*aa*-292*mn*. For example, the object weight values 292*aa*-292*mn* may be decreased for objects that are determined to be a sky region, trees, a grassy region, a muddy region, etc. If the object class does not correspond to a decrease for the object weight values 292*aa*-292*mn*, then the method 650 may move to the decision step 670. If the object class does correspond to a decrease for the object weight values 292*aa*-292*mn*, then the method 650 may move to the step 668. In the step 668, the CNN module 190*b* may decrease the object weight value based on the class of the object (e.g., based on the class definition in the neural network model 260). Generally, the decrease may reduce the object weight values 292*aa*-292*mn* from the default value of one to the decreased value of zero. Next, the method 650 may move to the decision step 670.

In the decision step 670, the CNN module 190*b* may determine whether there are more objects in the video frame 252*i*. For example, the object weight value may be determined for each of the objects of interest. If there are more objects of interest in the video frame 252*i*, then the method 650 may return to the decision step 662. If the object weight values have been determined for each of the objects of interest in the video frame 252*i*, then the method 650 may move to the step 672.

In the step 672, the CNN module 190*b* may present the object information for generating weight tables. For example, the signal OBJ may be presented to the weight table module 256. The weight table module 256 may use the information in the signal OBJ to generate the AWB weight tables (e.g., the object weight table 284*i* specific to the particular one of the video frames 252*a*-252*n* analyzed). Next, the method 650 may move to the step 674. The step 674 may end the method 650.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation. The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive pixel data; and a processor configured to (i) process said pixel data arranged as video frames, (ii) perform computer vision operations on said video frames to detect objects in said video frames, (iii) analyze characteristics of said objects detected in a current video frame of said video frames, (iv) determine adaptive auto-white balance weightings for each block region of said current video frame in response to (a) a default weight value and (b) increasing or decreasing said default weight value based on said characteristics of said objects detected, (v) generate an auto-white balance weighting table based on said adaptive auto-white balance weightings specific to said current video frame and (vi) generate output video frames, wherein (a) each of said output video frames is generated in response to using said auto-white balance weighting table generated specific to said current video frame to adjust white balance gain values in said current video frame based on said characteristics of said objects in said current video frame, (b) each of said adaptive auto-white balance weightings corresponds to a respective one of a plurality of block regions comprising all locations of said current video frame, (c) each of said adaptive auto-white balance weightings is used to determine a corresponding one of said white balance gain values in said respective one of said plurality of block regions of said current video frame, and (d) said auto-white balance weighting table is individually generated for only specific use with said current video frame to dynamically adjust to said characteristics specific to said objects detected in said current video frame being analyzed.

2. The apparatus according to claim 1, wherein said apparatus is configured to perform object-based auto-white balance to generate said output video frames.

3. The apparatus according to claim 1, wherein (i) said analysis of said characteristics of said objects comprises determining one of a plurality of types for each of said objects detected and (ii) each of said types of said objects comprises a pre-defined object weight value for said adaptive auto-white balance weightings.

4. The apparatus according to claim 3, wherein (i) a location of each of said objects is detected in said current video frame, (ii) said pre-defined object weight value is assigned to each of said block regions corresponding to said locations of said objects based on said types of each of said objects detected and (iii) said adaptive auto-white balance weightings are determined for each of said block regions corresponding to said location by combining said pre-defined object weight value and one of said white balance gain values for one of said block regions.

5. The apparatus according to claim 1, wherein (i) said analysis of said characteristics of said objects comprises determining a size of each of said objects detected in response to a number of blocks of said current video frame that comprises said objects and (ii) a pre-defined value for said adaptive auto-white balance weightings is selected in response to said size by applying said pre-defined value to each of said blocks of said current video frame that comprises said objects.

6. The apparatus according to claim 5, wherein said size of said objects detected is determined in response to size information in a neural network model.

7. The apparatus according to claim 1, wherein (i) said analysis of said characteristics of said objects comprises determining location coordinates for each of said objects detected, (ii) each region of said current video frame comprises a pre-defined value for said adaptive auto-white balance weightings, and (iii) said pre-defined value is assigned to said objects detected based on a match between said location coordinates and said region of said current video frame.

8. The apparatus according to claim 1, wherein (i) said analysis of said characteristics of said objects comprises determining an importance of each of said objects detected and (ii) a pre-defined value for said adaptive auto-white balance weightings is applied to said objects detected based on said importance.

9. The apparatus according to claim 8, wherein said importance of said objects is highest for said objects determined to be clouds and lowest for said objects determined to be a sky region, trees, grass and mud.

10. The apparatus according to claim 1, wherein said adaptive auto-white balance weightings are assigned to a location in said auto-white balance weighting table that corresponds to said block regions of said objects detected in said current video frame.

11. The apparatus according to claim 1, wherein locations in said auto-white balance weighting table that do not comprise said adaptive auto-white balance weightings that correspond to said objects detected are selected using default values from a fixed weighting table.

12. The apparatus according to claim 1, wherein said auto-white balance weighting table is individually generated on a per-frame basis for each of said video frames in real-time as said pixel data for said video frames is received from an image sensor.

13. The apparatus according to claim 1, wherein (i) said current video frame is divided into blocks of pixels based on said block regions of said current video frame, (ii) said white balance gain values are determined for each of said block regions, (iii) an object weight value is determined for each of said block regions, and (iv) said auto-white balance weighting table comprises said adaptive auto-white balance weightings for each of said blocks in response to a combination of (a) one of said white balance gain values and (b) said object weight value that corresponds to a particular one of said block regions.

14. The apparatus according to claim 13, wherein (i) said white balance gain values are generated by an image signal processor and (ii) said object weight value is generated in response to said computer vision operations performed in response to a neural network model implemented by said processor.

15. The apparatus according to claim 13, wherein performing an iterative summation operation for each of said blocks that adds a result of a multiplication operation performed on said white balance gain values and said object weight value corresponding to one of said blocks in each iteration implements said combination of (a) said white balance gain values and (b) said object weight value.

16. The apparatus according to claim 1, wherein said auto-white balance weighting table comprises said adaptive auto-white balance weightings that are individualized for said current video frame based on said computer vision operations performed on said current video frame.

17. The apparatus according to claim 1, wherein generating said auto-white balance weighting table specific to each of said video frames enables said processor to adjust a white balance of each of said video frames in response to (a) a movement of said objects over a sequence of said video frames and (b) a change of a scene in said video frames over said sequence of said video frames.

18. The apparatus according to claim 1, wherein said characteristics of said objects detected comprise a color temperature.

19. The apparatus according to claim 1, wherein said adaptive auto-white balance weightings are selected for said objects detected to (i) provide an accurate reference for calculating white balance gain for said current video frame and (ii) ignore said objects that provide white balance statistics that provide incorrect white balance results in particular color temperature environments.

20. An apparatus comprising:

an interface configured to receive pixel data; and a processor configured to (i) process said pixel data arranged as video frames, (ii) perform computer vision operations on said video frames to detect objects in said video frames, (iii) analyze characteristics of said objects detected in a current video frame of said video frames, (iv) determine adaptive auto-white balance weightings for each block region of said current video frame in response to said characteristics of said objects detected, (v) generate an auto-white balance weighting table based on said adaptive auto-white balance weightings specific to said current video frame and (vi) generate an output video frame in response to (A) using said auto-white balance weighting table to adjust white balance gain values in said current video frame when one of said objects is detected in said current video frame, said adaptive auto-white balance weightings are used to determine corresponding white balance gain values for respective block regions based on said characteristics of said objects and (B) using a fixed weighting table to adjust said white balance gain values in said current video frame when none of said objects are detected in said current video frame, wherein (a) said output video frame is generated in response to using said auto-white balance weighting table generated specific to said current video frame to adjust white balance gain values in said current video frame, (b) said auto-white balance weighting table is individually generated for only specific use with said current video frame to dynamically adjust to said characteristics specific to said objects detected in said current video frame being analyzed, and (c) said fixed weighting table comprises pre-defined white balance gain values selected for a particular type of scene captured in said video frames from a plurality of predefined scene types.

* * * * *